United States Patent
Yiu et al.

(10) Patent No.: US 10,366,298 B2
(45) Date of Patent: Jul. 30, 2019

(54) METHOD AND SYSTEM FOR IDENTIFYING OBJECTS IN IMAGES

(71) Applicant: Shoou Jiah Yiu, Los Altos, CA (US)

(72) Inventors: Shoou Jiah Yiu, Los Altos, CA (US); Gerald Friedland, Alameda, CA (US)

(73) Assignee: Shoou Jiah Yiu, Los Altos, CA (US)

( * ) Notice: Subject to any disclaimer, the term of this patent is extended or adjusted under 35 U.S.C. 154(b) by 21 days.

(21) Appl. No.: 15/346,620

(22) Filed: Nov. 8, 2016

(65) Prior Publication Data

US 2017/0132469 A1    May 11, 2017

Related U.S. Application Data

(60) Provisional application No. 62/253,588, filed on Nov. 10, 2015.

(51) Int. Cl.
*G06K 9/00* (2006.01)
*G06K 9/32* (2006.01)
*G06K 9/36* (2006.01)

(52) U.S. Cl.
CPC ........ *G06K 9/3241* (2013.01); *G06K 9/00711* (2013.01); *G06K 2009/3291* (2013.01); *G06K 2009/366* (2013.01)

(58) Field of Classification Search
None
See application file for complete search history.

(56) References Cited

U.S. PATENT DOCUMENTS

| | | | | |
|---|---|---|---|---|
| 9,189,854 B2* | 11/2015 | Dhua | ................... | G06K 9/4671 |
| 9,390,506 B1* | 7/2016 | Asvatha Narayanan | | ................... G06T 7/194 |
| 2009/0033745 A1* | 2/2009 | Yeredor | ................ | G01S 3/7864 348/152 |
| 2009/0174798 A1* | 7/2009 | Nilsson | .............. | H04N 1/00244 348/294 |
| 2014/0112544 A1* | 4/2014 | Yu | ........................ | G06K 9/6201 382/107 |
| 2015/0331711 A1* | 11/2015 | Huang | .................. | G06F 3/0481 719/320 |
| 2015/0356370 A1* | 12/2015 | Edwin | .................. | G06K 9/4604 382/199 |

* cited by examiner

*Primary Examiner* — Vikkram Bali
(74) *Attorney, Agent, or Firm* — Bachmann Law Group PC

(57) ABSTRACT

Disclosed is a computer implemented method for identifying an object in a plurality of images. The method may include a step of receiving, through an input device, a delineation of the object in at least one image of the plurality of images. Further, the method may include a step of identifying, using the processor, an image region corresponding to the object in the at least one image based on the delineation. Furthermore, the method may include a step of tracking, using the processor, the image region across the plurality of images.

18 Claims, 21 Drawing Sheets

METHOD AND SYSTEM FOR IDENTIFYING OBJECTS IN IMAGES

RELATED APPLICATIONS

This application claims priority from a U.S. provisional patent application No. 62/253,588, titled "Hyper Video Infrastructure" filed on Nov. 10, 2015, which is incorporated herein by reference in its entirety.

FIELD OF THE INVENTION

Generally, the disclosed invention relates to digital image processing. More specifically, the disclosure relates to methods and systems for identifying objects in a video and tracking the objects across the video.

BACKGROUND

In this era of digitization, the media, broadcast, and e-commerce industries are recognizing the role of video-based information delivery methods as more effective as compared to other information sharing methods like text, audio, and images. The digitization has not only evolved media industries but has also nurtured the e-commerce and education industries as well. Nowadays, people are increasingly connected to real-time media, which is delivered in the form of audio podcasts and video streams. Apart from this, cheaper Internet services and inexpensive computing devices have enabled people to fetch and view on-demand video broadcasts and live video playbacks. For example, the YouTube™ video streaming platform alone has reported the streaming of four billion videos each day from around the world. In addition, over 65,000 new videos are uploaded every day on the YouTube™ platform which includes tutorials, how-to-do guides, music videos, movies, technology updates, promotions, and many other resources.

Further, video production houses have been relentlessly engaging to upgrade the in-premise technologies to facilitate the speedy editing, producing, and rendering of fresh or modified digital videos to impart comprehensive information along with the visual display. Accordingly, industries are exploring the latest technologies that can extract or embed context-sensitive information, metadata, and other geographical information in relation to videos. For example, a context-sensitive video may allow users to fetch varied information about any object rendered in the video by simply selecting the object with different input operations such as long tap, right-click, double-click, and hover. The context-sensitive video may be helpful to e-commerce industries for promoting their products while enabling the viewers to select desired objects from the video to fetch information about the selected objects. Moreover, educational institutions or universities can reap benefits from producing video-based learning courses having annotations and hyperlinks to each object rendered in the video to help students learn faster and better.

Generating video objects having dynamic context-sensitive information may be challenging these days as some of the current video editors have limited object extraction features like Magic Wand™ and Intelligent Scissors™ which can semi-automatically extract foregrounds from an image or video object. In addition, these prior video editing platforms are inefficient to facilitate video editing at minute pixel-by-pixel levels without altering the representation of the video. For example, in a 33 second video consisting of 825 frames where a video object is present in all frames, any type of method to embed context-sensitive metadata information associated with the video object would mean doing the same operation manually 825 times. The challenge is to have an efficient and minimalistic way of allowing the user to define interactive links for video objects within a video even when it is moving from frame to frame with shape changes and other transformations. Hence, there is a need for a platform to create intuitive video objects including context-sensitive metadata.

SUMMARY

Disclosed is a computer implemented method for identifying an object in a plurality of images. The method may include a step of receiving, through an input device, a delineation of the object in at least one image of the plurality of images. Further, the method may include a step of identifying, using the processor, an image region corresponding to the object in the at least one image based on the delineation. Furthermore, the method may include a step of tracking, using the processor, the image region across the plurality of images.

Also disclosed is a system for identifying an object in a plurality of images. The system may include an input device configured for receiving a delineation of the object in at least one image of the plurality of images. Further, the system may include a processor configured for identifying an image region corresponding to the object in the at least one image based on the delineation. Furthermore, the processor may be configured for tracking the image region across the plurality of images.

DETAILED DESCRIPTION

Figure 1:
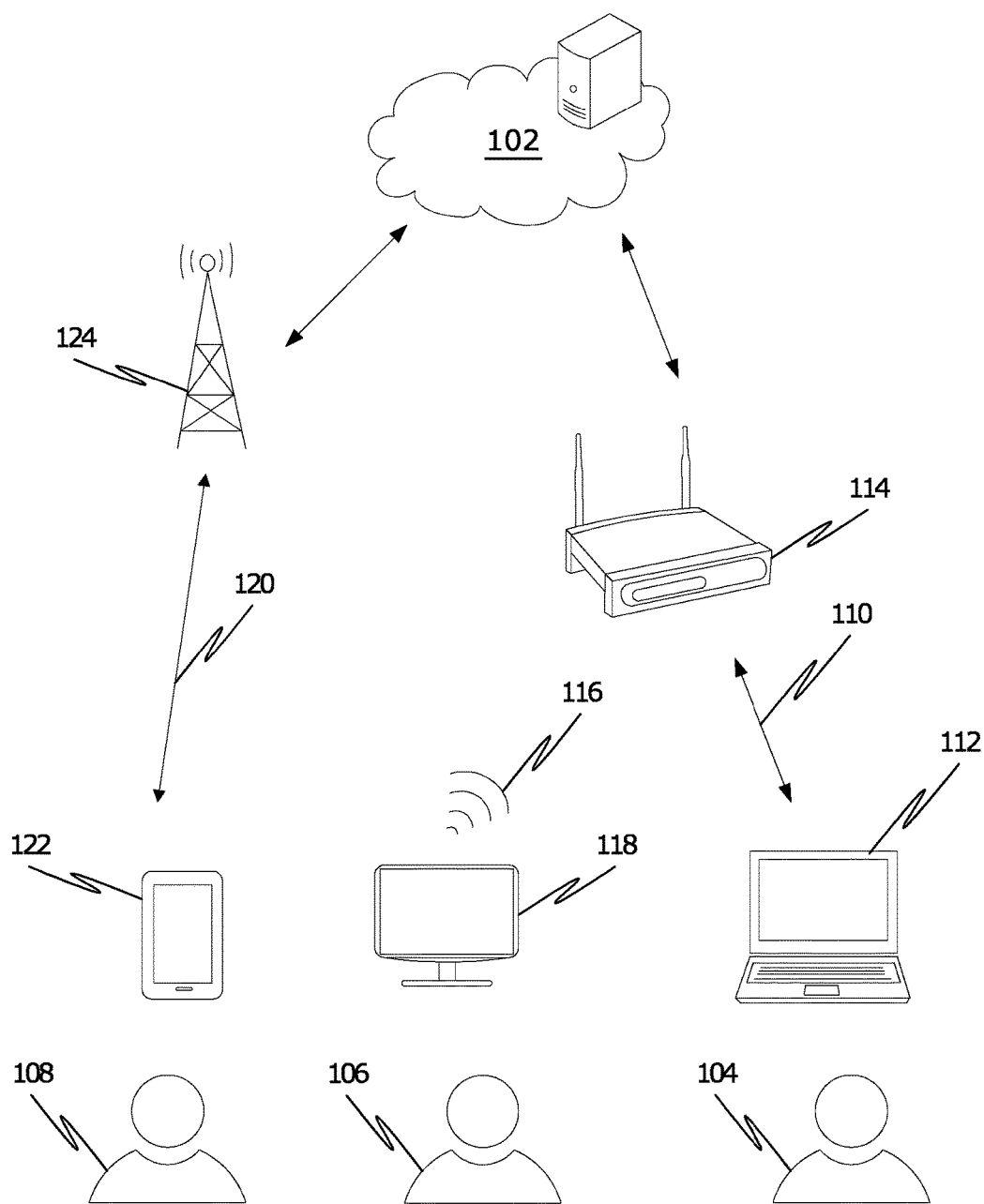
FIG. 1 illustrates an exemplary environment in which various embodiments of the present invention may operate.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary.

Overview:

Disclosed is a computer implemented method for identifying an object in a plurality of images. The method may include receiving, through an input device, a delineation of the object in at least one image of the plurality of images. Further, the computer implemented method may include identifying, using the processor, an image region corresponding to the object in the at least one image based on the delineation. Further, the computer implemented method may include tracking, using the processor, the image region across the plurality of images.

In some embodiments, the method may further may include associating a unique identifier with the image region corresponding to the object.

In some embodiments, the method may further include: comparing the image region with a plurality of delineated objects stored in a database; and associating a unique identifier with the image region based on a result of the comparing.

In some embodiments, identifying the image region based on the delineation may include: generating, using the processor, an initial mask based on the delineation; performing, using the processor, a graph cut on the initial mask to obtain a mask graph; and determining, using the processor, a single connected region constituting the image region based on the mask graph.

In some embodiments, the tracking may include: generating, using the processor, a contour including a plurality of contour points based on the image region; constructing, using the processor, a plurality of local windows corresponding to a plurality of contour points; estimating, using the processor, parameters corresponding to the plurality of local windows; moving, using the processor, the plurality of local windows across the plurality of images based on optical flow; and generating, using the processor, a mask of the object in at least one other image of the plurality of images based on parameters corresponding to the plurality of local windows subsequent to the moving.

In some embodiments, the computer implemented method may further include integrating the plurality of local windows to generate a probability image corresponding to each of the at least one other image of the plurality of images. Further, a value associated with a pixel of the probability image represents a probability of the pixel belonging to the object.

In some embodiments, generating the mask of the object in at least one other image of the plurality of images may be based further on the probability image corresponding to the at least one other image.

In some embodiments, the mask may be generated based on a matting algorithm.

In some embodiments, the method may further may include storing, in a storage device, at least one attribute corresponding to the object.

In some embodiments, the at least one attribute may include each of a position and a boundary associated with the object.

In some embodiments, the at least one attribute may include one or more of a name, a description, a Universal Resource Locator (URL), a price and a thumbnail photo.

In some embodiments, the at least one attribute may be stored in an eXtended Markup Language (XML) file. In some embodiments, the method may further include receiving, through the input device, an indication of a background corresponding to the object in the at least one image.

The present invention will be further illustrated with examples below. Referring first to FIG. 1 illustrating an environment 100 in which an embodiment of the present invention operates. The environment 100 includes a cloud server 102 configured to implement a computer based method to identify an object from plurality of images presentable to a plurality of users 104-108. In an embodiment, the cloud server 102 may provide a Hypervideo platform to produce the discretized, visually discernible video objects along with associated metadata. The Hypervideo platform may be accessed through an Internet Browser such as, but not limited to, Internet Explorer™, Google Chrome™, Firefox™, or Safari™.

A user 104 may connect to the cloud server 102 via Internet through a wired connection 110 between a laptop 112 and a modem 114. Similarly, the user 106 may connect to the cloud server 102 via Internet through a wireless connection 116 (Wi-Fi connection) between a desktop computer 118 and a modem, which may be the modem 114. Similarly, the user 108 may connect to the cloud server 102 via Internet through a wireless connection 120 (which may be one of 3G, LTE, or Wi-Fi connection) between a cell phone 122 and a cell tower 124. Further, the users 104-108 may install a standalone application for the Hypervideo platform on the laptop 112, the desktop computer 118, and the cell phone 122. Accordingly, the users 104-108 may obtain the standalone Hypervideo platform, from the cloud server 102, which may then be operated without necessarily connecting to the modem 114, cell tower 124, or wireless connection 116.

Figure 2:
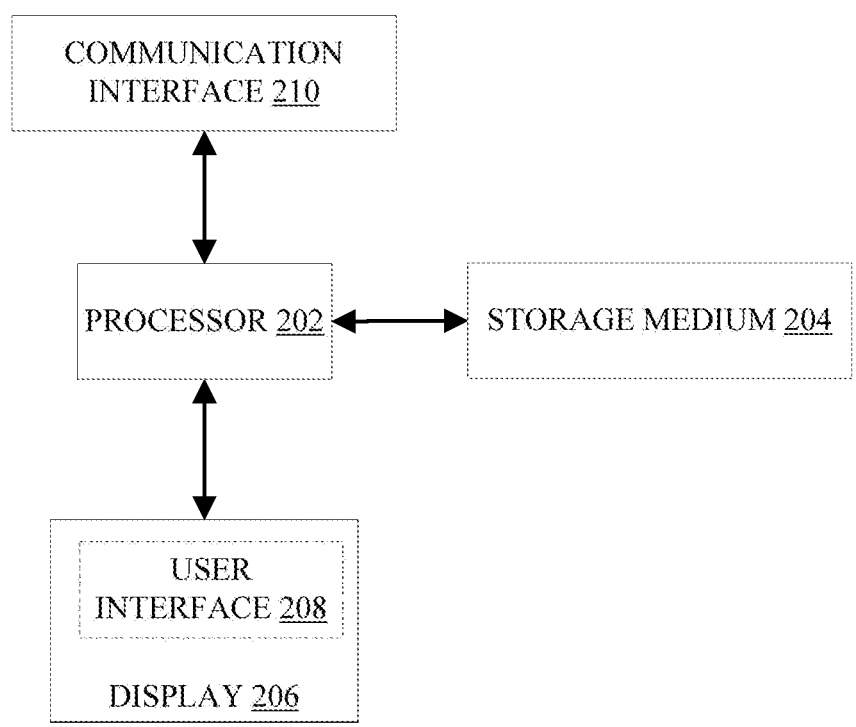
FIG. 2 is a block diagram of a system for identifying objects in images, in accordance with an embodiment.

Now, referring to FIG. 2, the cloud server 102 for providing the Hypervideo platform is illustrated in accordance with an embodiment. The cloud server 102 includes one or more processors (for example, a processor 202), a storage medium (e.g., a memory) 204, and a display 206 (optional). The storage medium 204 stores instructions that, when executed by one or more processors 202, cause one or more processors 202 to produce visually discernible video objects with associated metadata in accordance with various embodiments. The communication interface 210 establishes a connection to the cloud server 102 to operate the Hypervideo platform remotely using the computing device such as laptop 112, desktop computer 118, and cell phone 122. Further, the communication interface 210 may also facilitate the connection to the cloud server 102 to obtain the standalone application of the Hypervideo platform. In an embodiment, storage medium 204 may be a computer readable medium. The cloud server 102 may interact with users via a user interface 208 accessible to the users via display device 206. This is explained in further detail in conjunction with FIG. 3, FIG. 4 and FIG. 5 below.

Figure 3:
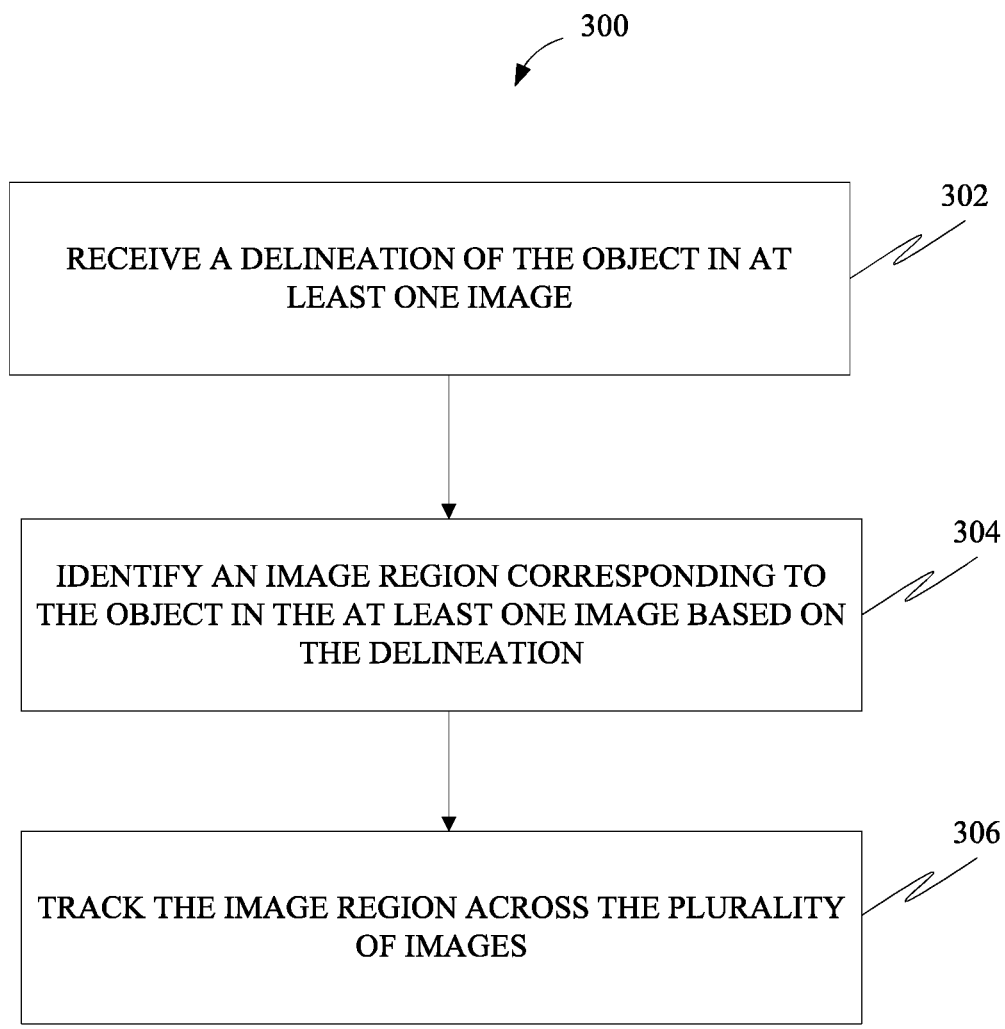
FIG. 3 illustrates a flowchart of a method of identifying and tracking an object across multiple images, in accordance with an embodiment.

FIG. 3 illustrates a flowchart 300 of a computer implementable method to identify an object in multiple images using the Hypervideo platform, in accordance with an embodiment. The multiple images may correspond to a video which may be produced for motion pictures, webcasts, promotions, tutorials and may be compiled in formats such as, but not limited to, MPEG-1™, MPEG-2™, Matroska™, GIF™, 3GPP™, MPEG-4™, AVI™, and RealMedia™. Further, the video, including multiple still images, project an illusion of moving the object when the compiled form is played at a specific frame rate. Each frame in the video may corresponds to an image of the multiple images. The multiple images when combined form a singleton video file. Further, each image in the multiple images is a collection of pixels. Each pixel may be represented in one or more colors based on a number of bits per pixel (bpp).

At 302, the Hypervideo platform receives a delineation of the object in one or more images of the multiple images through an input device. The delineation is a process of identifying and outlining the object in the one or more images of the multiple images. One or more users in the users 104-108 may input the delineation of the object using the input device. The input device may include devices such as, but not limited to, a mouse, a keyboard, a touchscreen (via a finger or a stylus). The input device may be connected to a computing device such as the laptop 112, the desktop computer 118, or the cell phone 122. Alternatively, in some embodiments, the Hypervideo platform may be configured to automatically detect the video object based on the calculations of pixel values associated with the delineated object.

Figure 7:
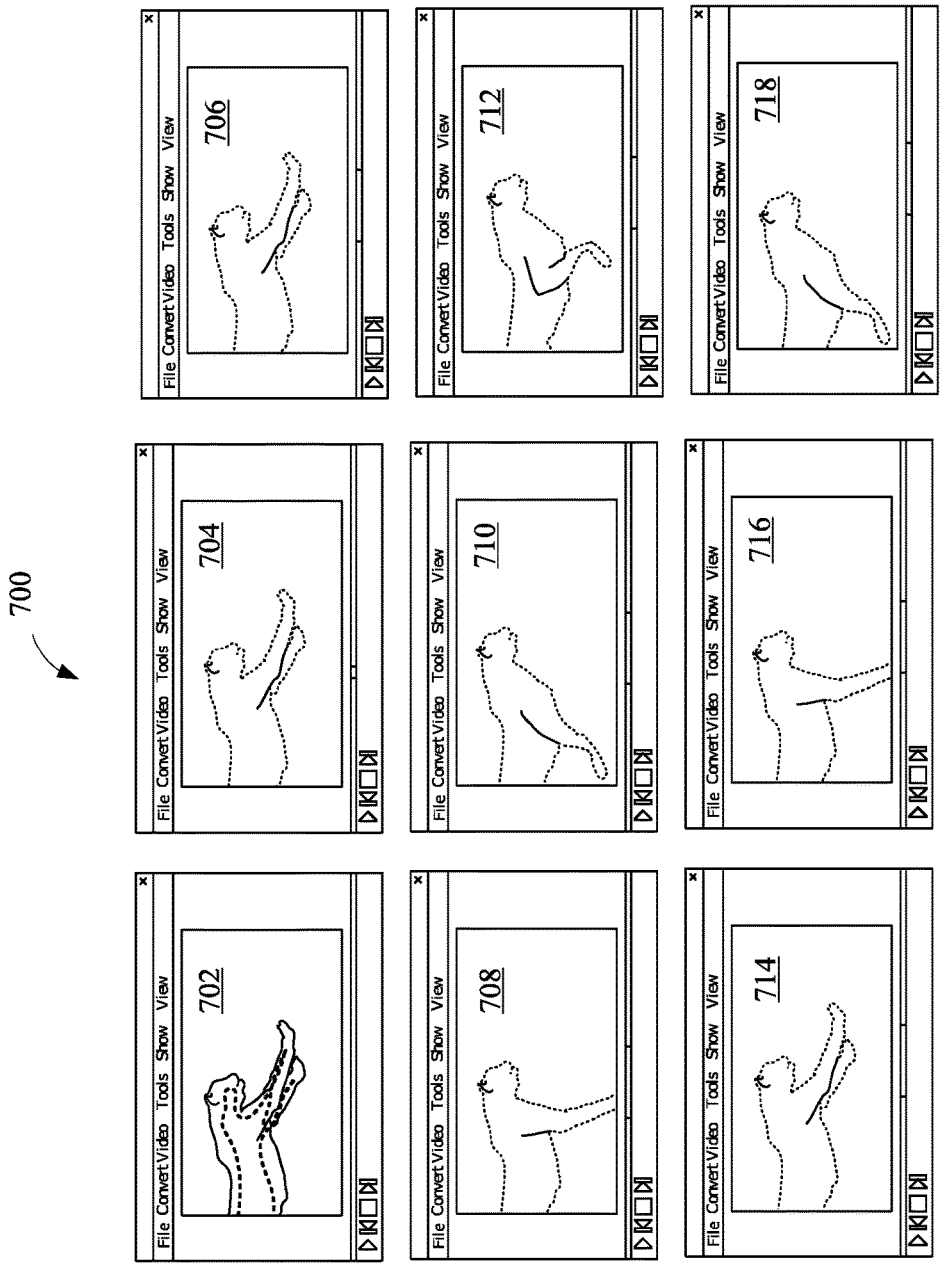
FIG. 7 illustrates a user interface depicting delineation of an object in a video frame, identifying of an image region corresponding to the delineation and subsequent tracking of the image region across multiple frames of the video, in accordance with an embodiment.

The one or more users may input the delineation of the object as accurate as possible to the visually discernible boundaries that represent the object itself. For example, a general rectangular boundary surrounding the object may make it difficult to track the object across multiple images. Further, the fidelity to the visually discernible boundary is not only for its aesthetic quality but is necessary as a typical video has many video objects interleaving and intersecting each other. Therefore, the object extraction tools such as, but not limited to, Magic Wand in Adobe Photoshop™ or Intelligent Scissors in GIMP™, may be inadequate to perform accurate delineation of the object in an image and then track the object across multiples images. Further, the Hypervideo platform may be configured in such a way that enables the user to point, mark, or outline the delineating object using the input device. An example of delineation of an object provided by a user is shown in FIG. 7. A user interface 702 shows a video player playing a video. The video includes multiples images of an object (such as, a cheetah 704) in a running state. The user interface 702 shows one frame from the video at a particular time. A dotted line 706 inside the object (the cheetah 704) indicates the delineation performed by the user using the input device.

Next, at 304, the Hypervideo platform may be configured to identify an image region corresponding to the object in the multiple images based on the delineation. The identifying of the image region may be performed by the one or more processors 202. The Hypervideo platform may be provisioned with a Select-Region algorithm which may automatically identify the boundaries of the object. The Select-Region algorithm may be configured to generate the image region based on the delineation provided by the user. Since the delineation is performed manually by a user, the object may not be accurately delineated. For instance, certain regions internal to the object may be missed by the delineation while certain regions external to the object may be incorrectly delineated as belonging to the object. Accordingly, such inaccuracies of the delineation performed by the user may be compensated by the Select-Region algorithm, for example, by pixel growing and/or pixel shrinking. Accordingly, the Select-Region algorithm may identify the image region which is a more accurate delineation of the object than that provided by the user. As an example, the image region may be identified based on color values of the delineated object, in particular proximal to the periphery of the delineation. FIG. 7 illustrates an example of the image region which may be automatically identified by the Hypervideo platform based on the delineation provided by the user. The user interface 708 shows the object (the cheetah 710). The region enclosed in the dotted line 712 indicates the image region.

Next at 306, the Hypervideo platform may be configured to track the image region across the multiple images of the video. The tracking of the image region may be performed using the one or more processors 202. Further, the Hypervideo platform may be configured to execute a Tracking algorithm which may generate a contour including multiple contour points based on the tracked image region. The Tracking algorithm is described in conjunction with FIG. 5. The contour of the delineated object may be the detected boundaries of the object. Further, the Hypervideo platform may be configured to create an XML file which may contain metadata. For example, a DSLR camera generates technical image metadata such as dots per inch, ISO number, aperture, and shutter speed. The user may also generate the image metadata which may include captions, a title, a name of the image, and a keyword associated with the image. Similarly, the image metadata may describe the object's information from a previous run of one or more of the Select-Region algorithm and the Tracking algorithm. Further, the object's information may include the image region and the contour in the multiple images. For example, the XML file may contain the metadata describing the cheetah 704 in FIG. 7. The XML file may include the object information such as, but not limited to, a name, a description, a URL, a price, a thumbnail photo, or a video.

Figure 4:
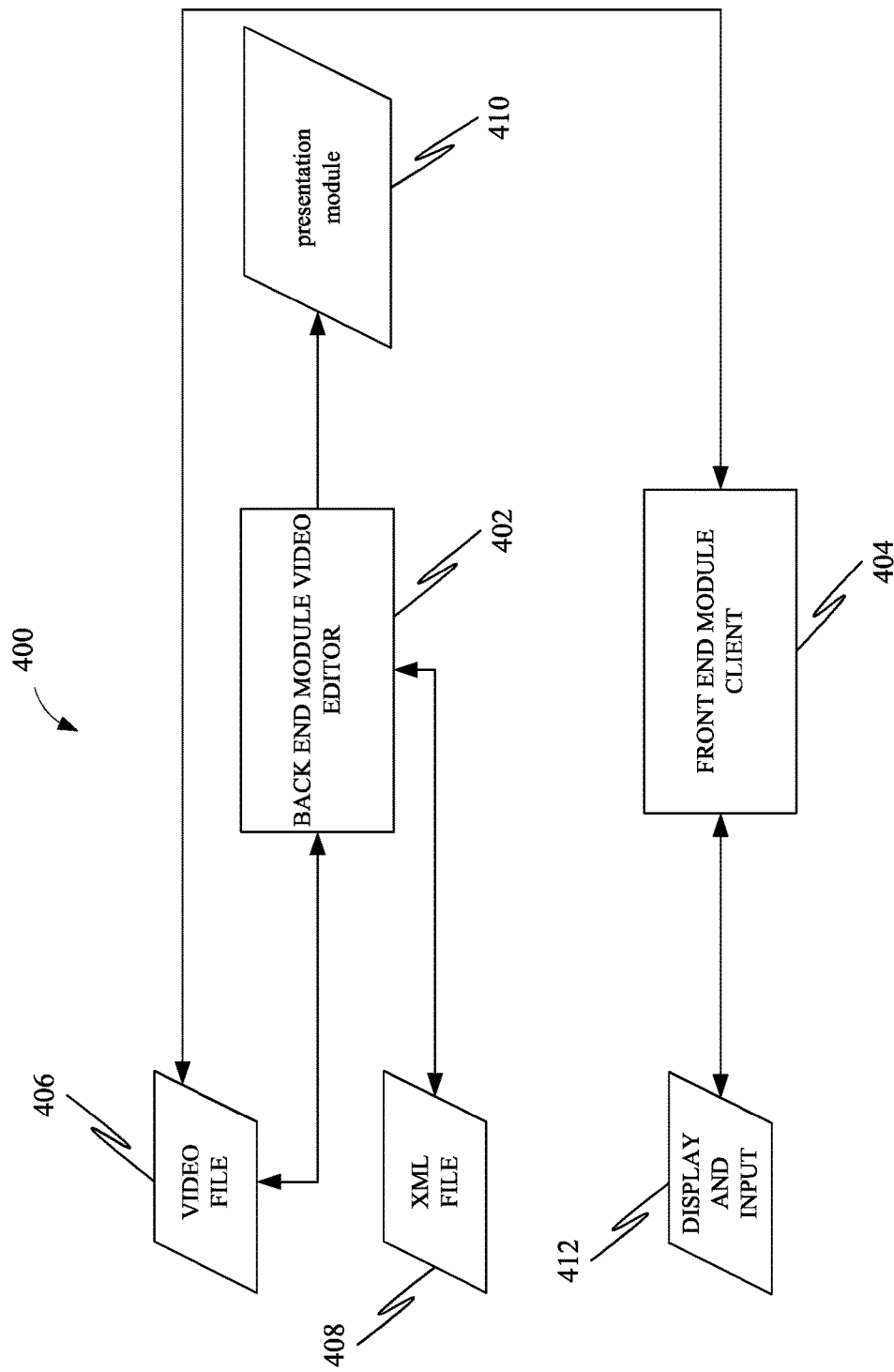
FIG. 4 illustrates a functional block diagram of a system for identifying an object in an image, in accordance with an embodiment.

FIG. 4 illustrates a functional block diagram 400 of the Hypervideo platform, in accordance with an embodiment.

The Hypervideo platform may include a back end module 402 and a front end module 404. The back end module 402 may identify and track the object in the multiple images. Further, the back end module 402 may read a video file 406 to identify and track the object in the multiple images. The user may further add the metadata associated with the object using an XML file 408. The XML file 408 is previously explained in conjunction with step 306 of FIG. 3. Further, the Hypervideo platform may be configured to store the object in the storage medium 204. The Hypervideo platform may include a presentation module 410 which may be configured to display the object. Further, the presentation module 410 may read and render the metadata, associated with the object, on a display and input interface 412. Further, the presentation module 410 may support computer-readable programming languages such as, but not limited to, HTML5™, CSS3™, JavaScript™, and XML™.

Figure 5:
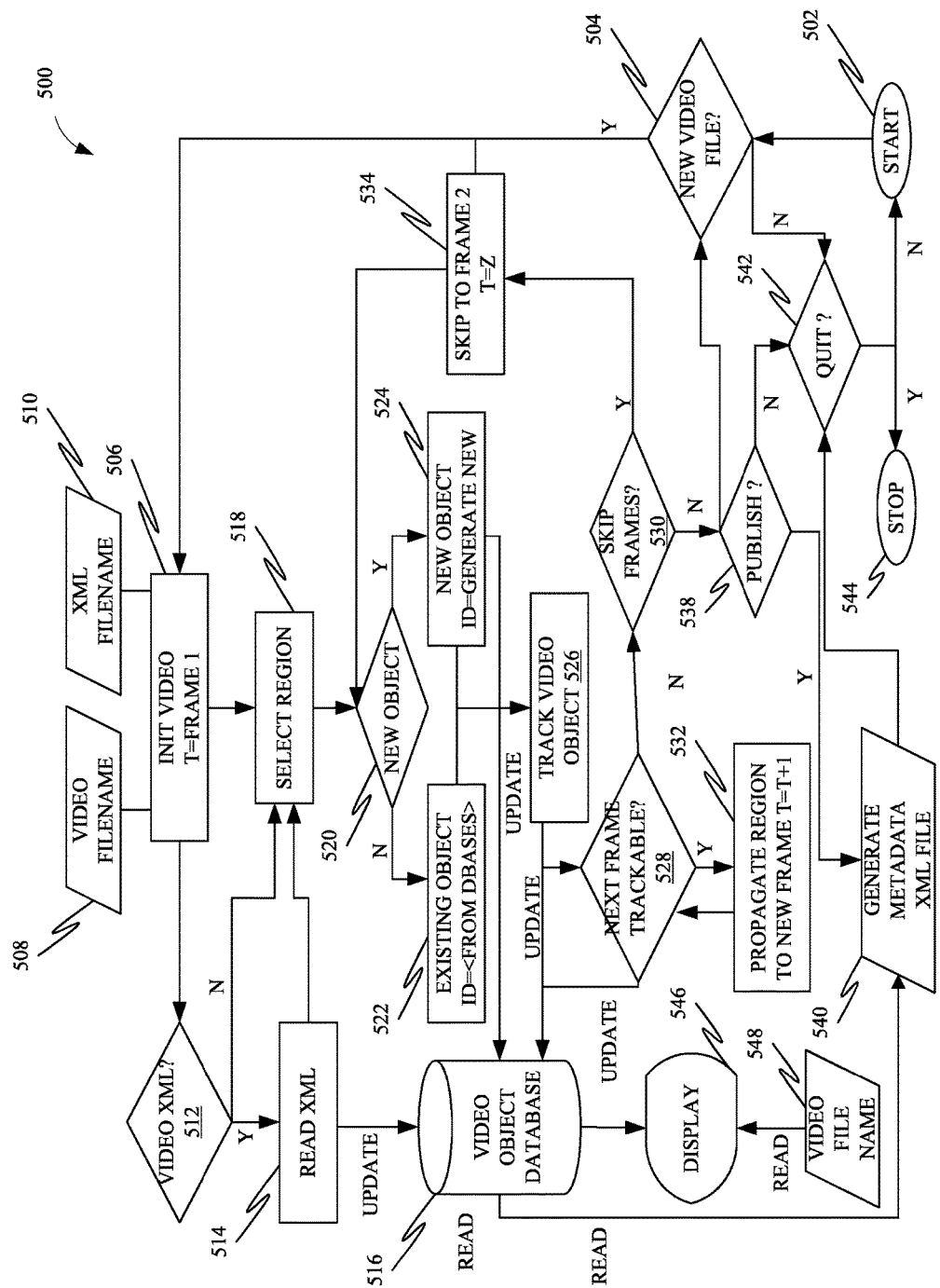
FIG. 5 illustrates a flowchart of a method for identifying, tracking, and storing an object appearing in multiple images, in accordance with an embodiment.

FIG. 5 illustrates a flowchart 500 of a method for identifying, tracking, and storing an object from multiple images, in accordance with another embodiment. At 502, the Hypervideo platform may start to read the object in the multiple images. The multiple images may correspond to a video file. Subsequently, at 504, the back end module 402 may parse the video file including one or more objects. Further, at 506, if the video file is new, then the video file may be initialized at 506. If the video file is not new, then at 508, the method may quit the read operation. Thereafter, at 510, the method may stop.

At 506, when the video file is initialized, then the information such as a video filename 512 and an XML filename 514 may be fetched from the video file. Further, a variable "T" is initialized to point to a first frame of the video file as indicated by the statement "T=Frame 1" at 506. At 516, the back end module 402 may parse the video file and the XML file 408 to determine if the files are already stored on a video object database 518. Further, at 520, if the video file and the XML file is found on the video object database 518, then the metadata saved in the XML file is parsed and extracted from the XML filename 514 and reconstructed into the video object database 518. The video object database 518 is explained in detail in conjunction with FIG. 9.

Figure 9:
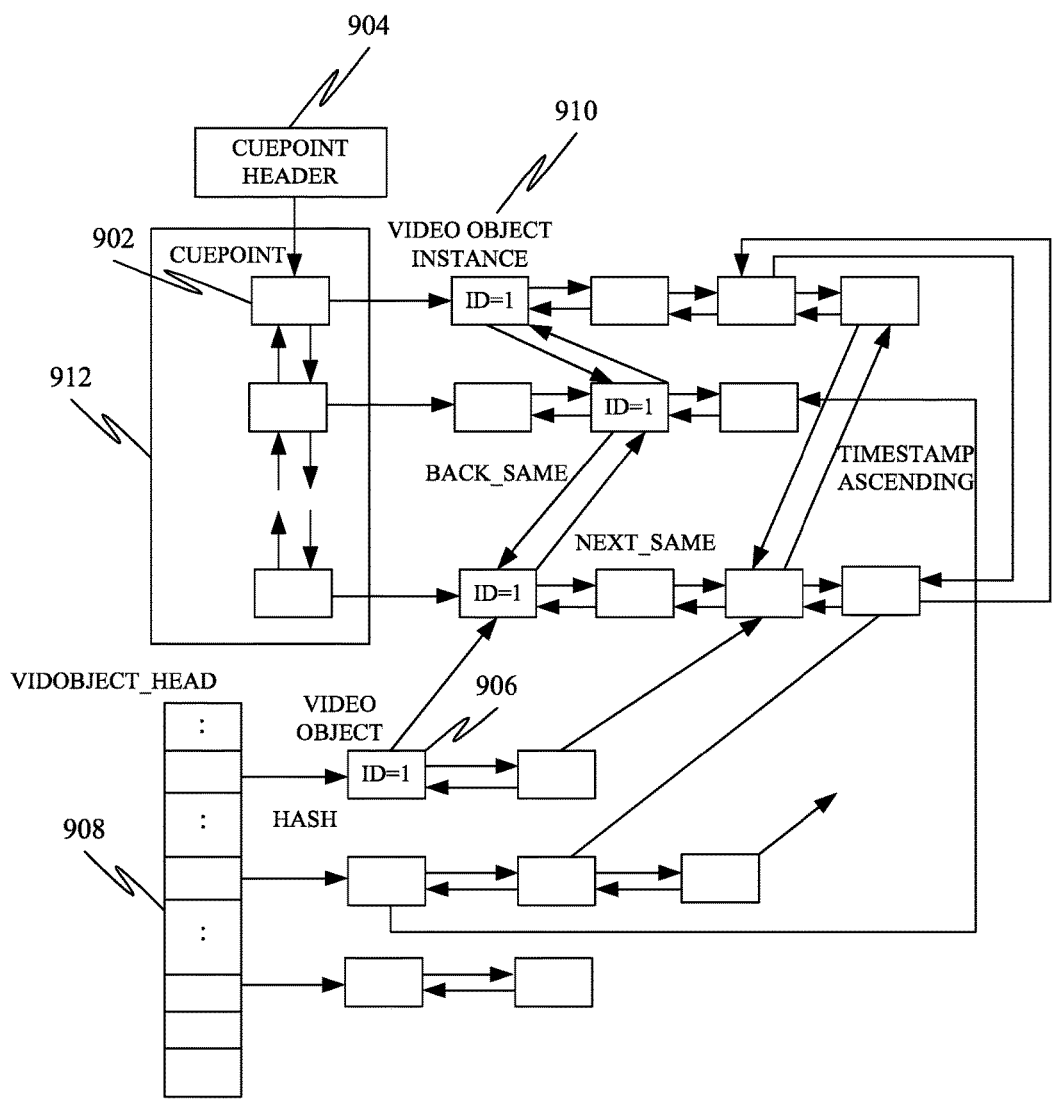
FIG. 9 illustrates a block diagram depicting storing of at least one attribute of the object, in accordance with an embodiment.

FIG. 9 illustrates a block diagram 900 of a database 518 for storing the one or more attributes of the object, in accordance with an embodiment. The Hypervideo platform may be provisioned with the video object database 518, which may include one or more variables such as, but not limited to, a CuePoint 902, a CuePoint Header 904, a Object 906, a Object_Head 908, an Object Instance 910 and a list of CuePoints 912. The CuePoint 902 may represent a particular frame. A primary key for the frame may be the timestamp. The frame may include the multiple images. The CuePoint Header 904 may be the header pointing to the list of CuePoints 912. The list of CuePoints 912 may include the multiple CuePoints.

Further, the Object 906 may represent a unique object in the multiple images. The primary key of the Object 906 may be a global unique ID. The unique ID may include one or more attributes such as, but not limited to, the description of the object, the price of the object, and the URL of a website. The Object_Head 908 may represent an array of Objects 906. During an optimization, each index in the array may be a list of one of more Objects 906 that share the same array index by the following hash function: Index=Hash(ID).

The indexing may be performed to sort multiple Objects 906 based on multiple unique IDs. The optimization may be optional. If the optimization is not performed, then the array index may be a bucket of one, where each index matches one-to-one to each unique Object (ID). Further, the Object Instance 910 may represent the occurrence of the Object 906 at the particular CuePoint 902. The Object Instances 910 of the same Video Object 906 may be connected by an ascending timestamp. The primary key of the Object 906 may be the global unique ID. Further, the attributes may include a list of bounded regions. The bounded region may include the coordinates that describe a delineated boundary of the Object 906. Further, the Object Instance 910 may include the one or more bounded regions.

Additionally, the video object database 518 may be configured to search for all Object Instances 910 which may include the multiple Object Instances 910 for the given CuePoint 902 (timestamp). Further, the user may find all the occurrences of the Object (ID), in the chronological order, of the next occurring Object Instance 910 in the next CuePoint 902. Additionally, the user may also find all the occurrences of the Object (ID) in the chronological order of next occurring Object Instance 910. The timestamps may be non-contiguous.

Referring again to FIG. 5, at 522, the user may input the delineation of the object in the multiple images. The delineation of the object may be carried out by using the display and input interface 412. The user may also select the background that is to be excluded from the object. For example, FIG. 7 shows the user interface 702 displaying the object (the cheetah 704). The dotted-line 706 represents the delineation performed by the user. At 524, if the Object (ID) exists in the video object database 518, then the Tracking algorithm may be executed. However, if at 524, it is determined that the Object (ID) does not exist in the video object database 518, then at 526, a new object having a unique ID may be generated. The unique ID of the new object may be updated to the video object database 518.

At this instance, the user may visually inspect a frame and decide that a visually identifiable object (for example, the cheetah 704) in the frame may be the designated object. Thereafter, the user may use the pointing device to draw over the region which represents the object of interest (for example, the cheetah 704). The Select-Region algorithm is then automatically applied to delineate the boundary region surrounding the object. The Select-Region algorithm may be configured to identify the image region based on the delineation. For example, FIG. 7 illustrates the user interface 708 rendering the object (the cheetah 710). An area enclosed in the dotted line 712 may be identified as the image region.

A pseudo code for the Select-Region algorithm is provided below:

```
Step 1: Get initial mask (the input is points, Last_point the user
   draws in screen, the output is initial mask of object)
   mask_init;
      For every point pi in last_point
         Mask_init(pi) = 1 ;means object pixel
         Mask_init(x) = 1;|x-pi|2<=R,
      Where R is the radius of region centered in pi
Step 2: Use Graphcut (the input is mask_init, output is mask_graph)
Step 3: Extract Object (the input is mask_graph, the output a single
   connected region for representing the object that the user wants to
   select) if the region is not good as the wished, redraw the screen;
   For every connected region in mask_graph
      If pf and pl in this region
         Store this region as Video Object
            mask_object
where pf, pl is the first and last element in last_point respectively
```

As shown in the pseudo code of the Select-Region algorithm, at step 1, an initial mask is generated based on the delineation performed by the user. In the field of image processing, the mask is defined as a matrix used to perform operations such as, but not limited to, sharpen, emboss, blur, and outline. The matrix contains one or more elements arranged in the form of rows and columns. For example, a 3×3 matrix includes the 3 rows and the 3 columns. The 3×3 matrix includes 9 elements, each representing a numerical character. Further, the numerical characters have fixed values in accordance with the selected operation like sharpen, emboss, blur, and outline. The mask or matrix is then mathematically applied to each pixel of the object to generate the desired object. Hence, the masking process may restrict or allow some parts of the object in identifying the image region based on the matrix calculations. At step 2 of the Select-Region algorithm, a graph cut is performed on the initial mask to obtain a mask graph. The mask graph may represent multiple objects that may be connected in pairs sharing common pixel values. At step 3 of the Select-Region algorithm, a single connected region constituting the image region is determined based on the mask graph.

Referring back to FIG. 5, once the image region of the delineated object is identified, then at 528, the tracking of the object may be performed across the multiple images. The tracking of the delineated object may be performed via the Tracking algorithm in the remaining images of the multiple images.

The pseudo code for the Tracking algorithm is provided as follows:

```
Step 1: Get Contour -this will get all contour points last_contour
        according to input mask_object in selecting object step.
Step 2: Establish local window-generate local windows according to
        contour points.
        For every point p in lst_contour
            If it not be covered by previous local window,
                which is centered at point in last_contour
                create a new local window centered at p, radius is
            WINSIZE (WINSIZE is a constant)
                Store this local window to a vector windows_vector;
    Step 3: Estimate local window parameters-calculate parameters which
    can
        by used to represent features of local window
        For every local window in windows_vector
            Calculate color and shape model according to pixels
            covered by this local window and its local mask of
            mask_object
Step 4: Move Local Windows-move every local window from
        frame t to t+1, using optical flow;
Step 5: Get mask of object in frame t+1 - get the mask in frame t+1
        according to the parameters of the moved local windows;
            For every pixel covered by local windows
                Combine color probability and shape
Step 6: Go to 3) to iterate tracking this object, until one single object
exists.
```

The Tracking algorithm may be configured to track the image region of the object across the multiple images. At step 1, a contour is generated which may include multiple contour points corresponding to an identified image region. The contour may be the boundary of the delineated object. At step 2 of the Tracking algorithm, multiple local windows corresponding to the multiple contour points are constructed. A local window may be rectangular or square in shape and centered on a contour point.

Further, at step 3 of the Tracking algorithm, multiple parameters corresponding to the multiple local windows is estimated. The parameters may include the position and the boundary associated with the object. Further, as an example, the multiple parameters associated with a local window may include shape and/or color characteristics of the pixels encompassed within the local window. At step 4 of the Tracking algorithm, the multiple local windows across the multiple images may be moved in accordance with an optical flow. The optical flow refers to the movement or flow of the object across consecutive images of the video as indicated by a perceived flow of pixels with predetermined visual or optical characteristics between consecutive images. Thereafter, at step 5 of the Tracking algorithm, the mask of the object in the multiple images is generated. The mask may be generated based on the parameters corresponding to the multiple local windows subsequent to the moving. At step 6 of the Tracking algorithm, the method may iterate back at step 3 until the only one single object remains.

Referring again to FIG. 5, at 530, the frame may be advanced to a next frame "T". Further, the frame may be examined to check if the previously defined image region has a match in the new frame which is indicated in the statement as "T=T+1". At 532, a Propagation algorithm may detect the delineated boundary of the object to find a match. The delineated boundary may shift in accordance with the moving object. When the frame is advanced to the next frame, the metadata associated with the object may be updated to the video object database 518. Further, the updated metadata of the object may be displayed on the display 546.

The objective of the Propagation algorithm is to move the delineated object from a frame "$F_t$" to a frame "$F_{t+1}$". First, every local window is propagated to the frame "$F_{t+1}$", then the Tracking algorithm integrates these local windows to a probability image "$P_{t+1}$". Each pixel indicates the probability belonging to the object. Finally, an object mask "$M_{t+1}$" may be obtained in accordance with the probability image "$P_{t+1}$". The mask "$M_t$" may be obtained by using a matting algorithm. Further, the optical flow may be used for propagation of the local window. Only pixels that are within the delineated object are propagated to the next frame. Afterwards, the Propagation algorithm generates the probability image by integrating the multiple local windows. The probability image is indicated as "$I_{t+1}$". Further, a value associated with the pixel of the probability image represents a probability of the pixel belonging to the object. The value of the pixel in this image is the probability belonging to the foreground that is estimated using a GMM classifier.

Referring to the flowchart 500, at 532, if there is a match between the frame "T" and the frame "T+1", then it is deemed that the previously defined object may be detected in the "T+1" frame. The frame "T" may be set to the present frame which is indicated in the statement as "T=T+1". At 532, if the object in the "T" frame does not match with the object in the "T+1" frame, then the user may proceed to the new frame within the multiple images to continue the search. Further, at 534, the user may skip the frames to reach at 536. The frame may correspond to an image in the multiple images. At 536, the user may skip directly to a new frame "Z" (fast forwarding or scrubbing). The variable "T" may be updated to the variable "Z" as indicated in the statement "T=Z". At this instance, the user may return back to search for the new object. Hence at 538, the user may decide to run either an existing object or a new object. Again at 534, the user may not perform the skip operation. At this instance, the user may save the updated metadata of the object in the XML file 408. The XML file 408 is previously explained in conjunction with 306 of FIG. 3.

Figure 8:
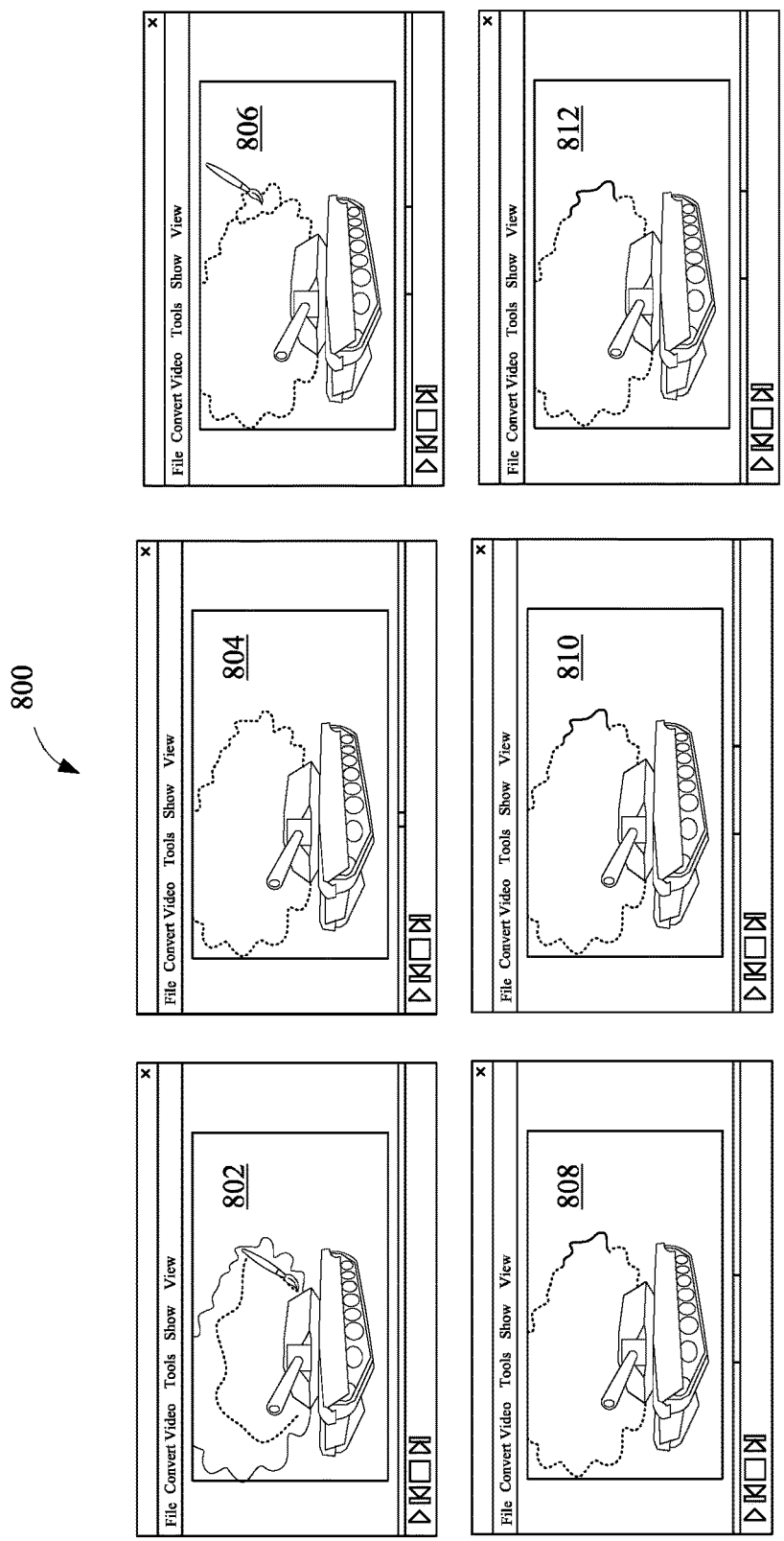
FIG. 8 illustrates a user interface depicting application of a sub-pixel accuracy brush in performing delineation of an object, in accordance with an embodiment.

In some embodiments, the Hypervideo platform may be configured to enable provision of a sub pixel accuracy brush (see FIG. 8, 806). The sub pixel brush may execute a sub-pixel accuracy algorithm to soften the delineated boundary (see FIG. 8, 802-812). Further, the sub pixel accuracy algorithm is described as follows.

While an image "$I_{t+1}$" contains the probability for each pixel of the frame "$F_{t+1}$" associated with the object, it still may not be good enough to cutout the object for two reasons. First, the propagation is sometimes unreliable, especially if the object moves quickly. Second, the shape or topology of the object may be changing continuously. Therefore, the matting algorithm may be used to cutout the object according to the image "$I_{t+1}$" and the mask "$M_t$". This helps especially, when the pixel in the image "$I_{t+1}$" is not exactly belonging to either foreground or background but is in-between (e.g. due to color spill). Accordingly, the disclosed method may use the HSI color space for color modeling. This may allows implementation of color matting in a fully automatic manner.

Further, the method affects the confidence probability "PR(P)" of a pixel "P" with a color "C" in the following way ("F" and "B" being the closest color in the foreground and the background model, respectively):

$$\text{``}PR(P) = 1 - \min\left(\frac{|C-F|}{|C-B|}, 1\right)\text{''}$$

Referring again to FIG. 5, at 540, all the frames of the object may be tracked. The user may save the tracked objects to the XML file 408 which may be used to publish. At 542, the object along with its metadata may be extracted from the video object database 518 to initiate the entire operation for another object.

Figure 13:
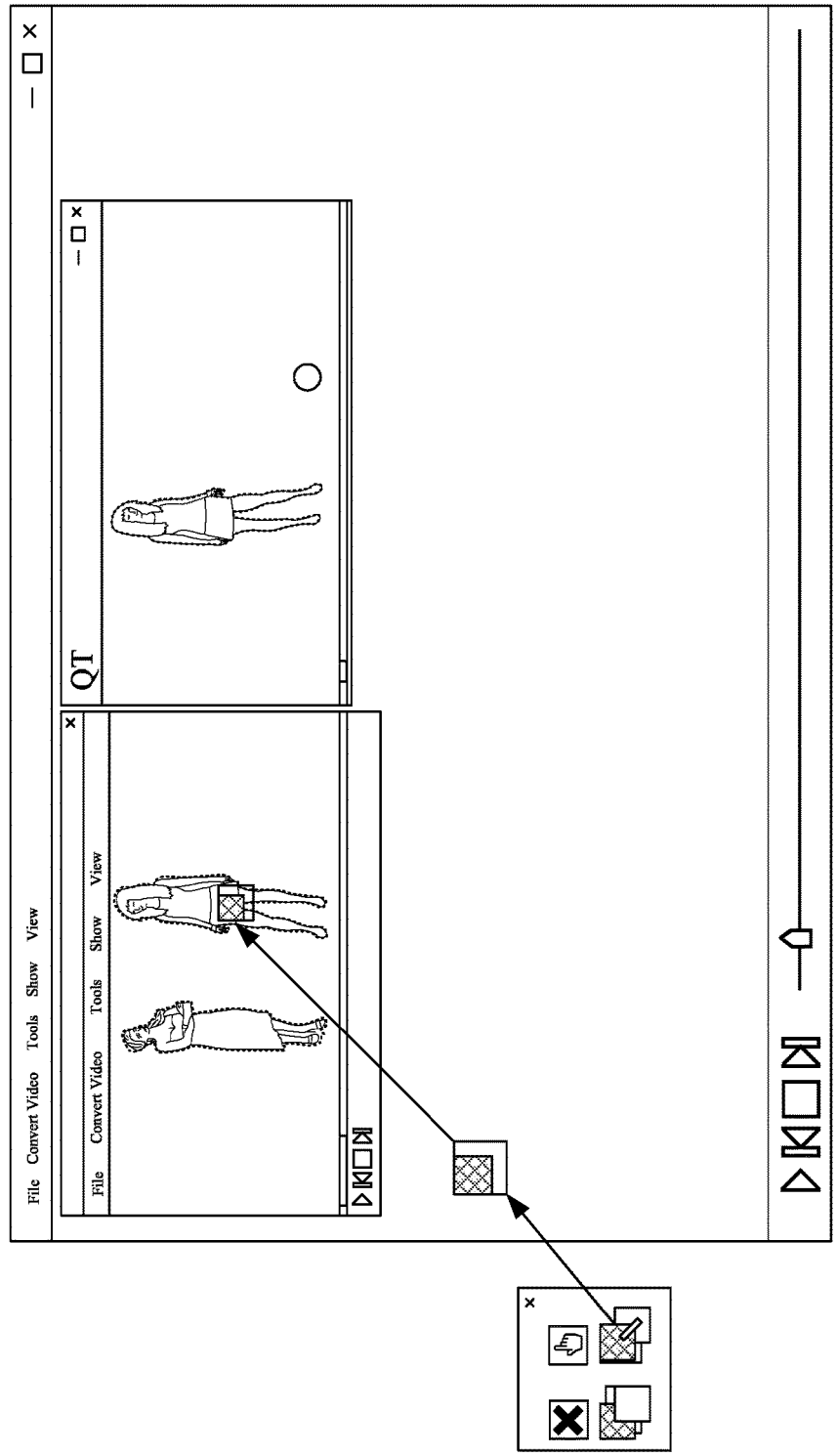
FIG. 13 illustrates a user interface depicting designating a selected image region as a front object, in accordance with an embodiment.
Figure 14:
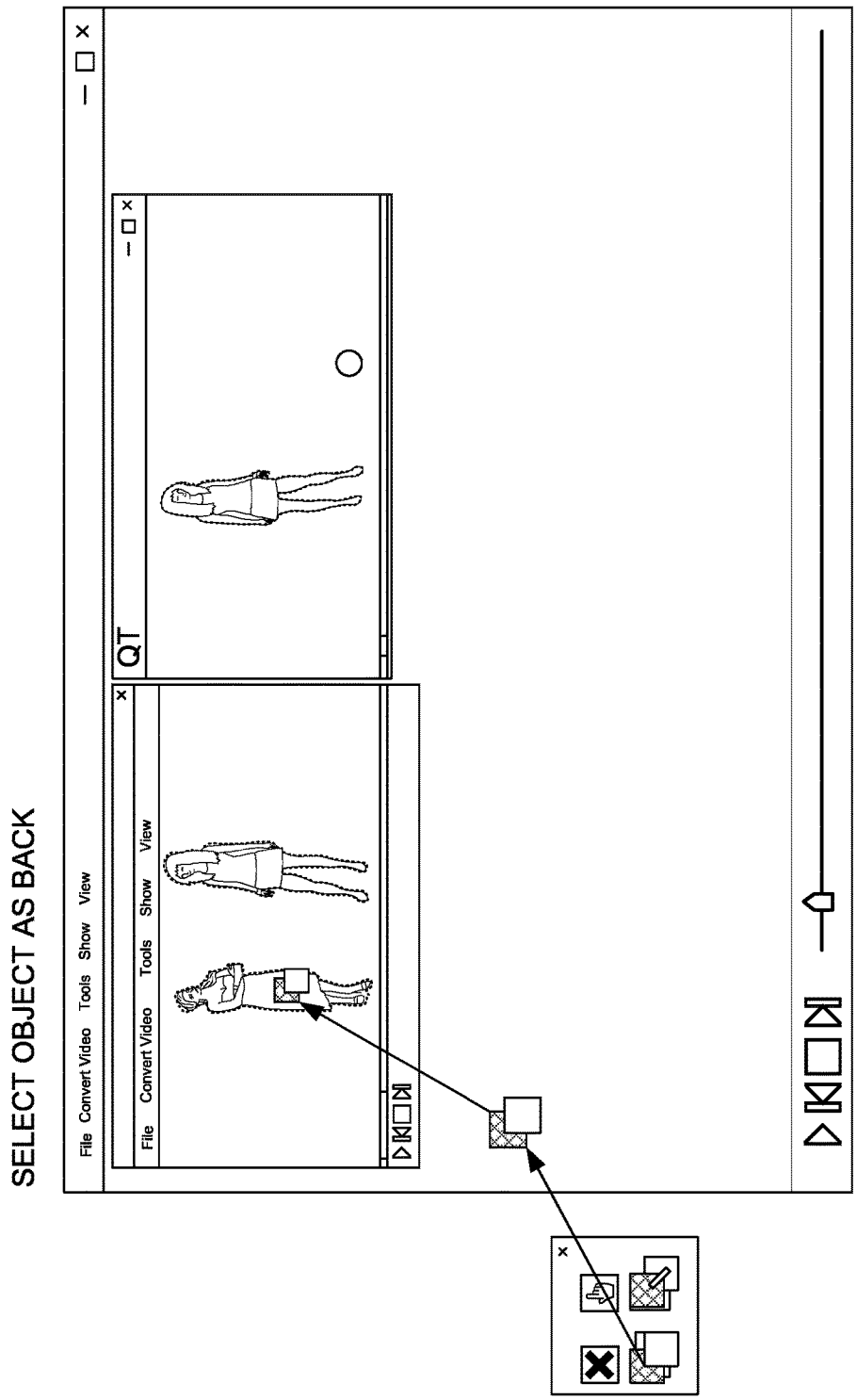
FIG. 14 illustrates a user interface depicting designating a selected image region as a back object, in accordance with an embodiment.
Figure 15:
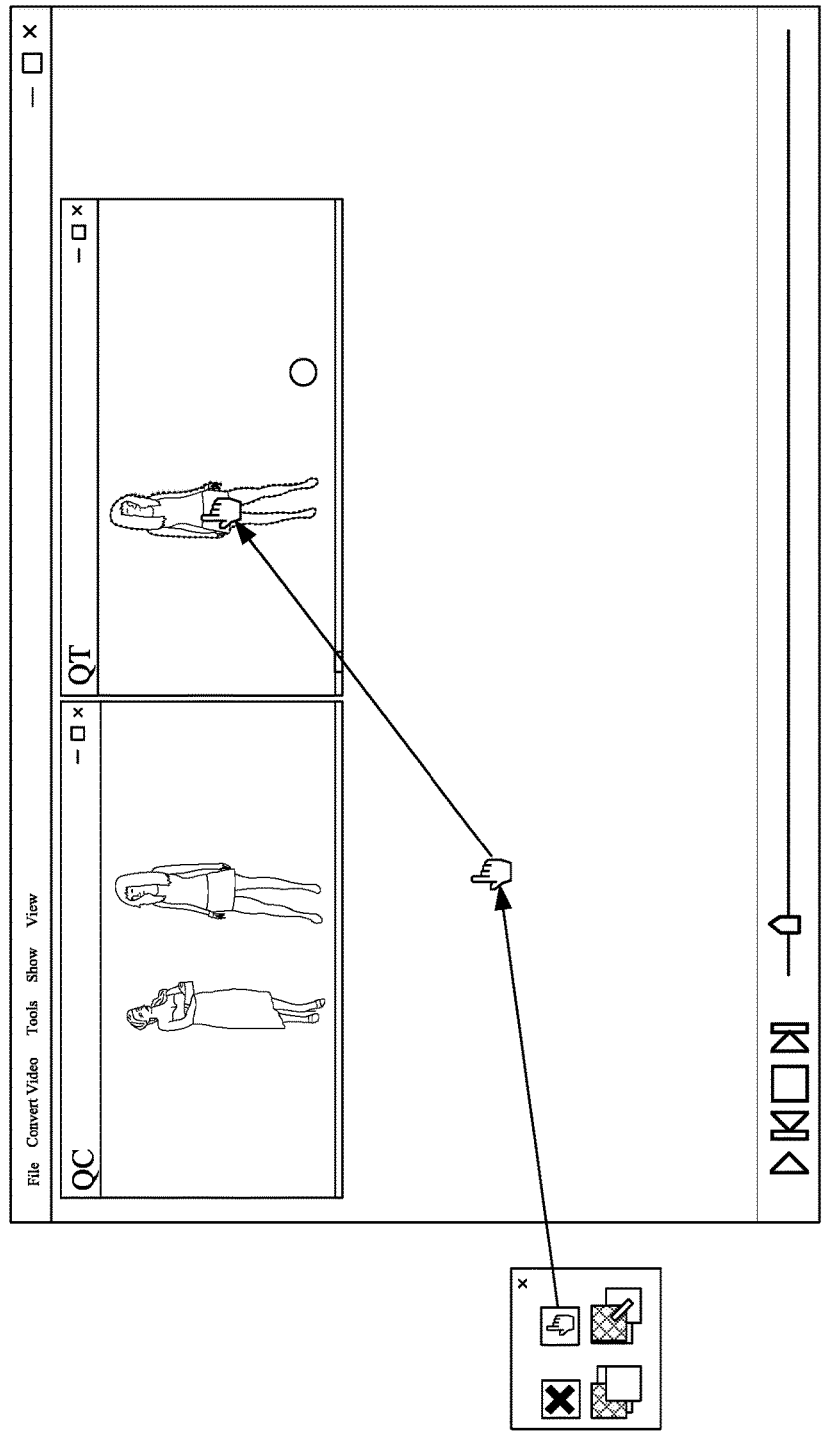
FIG. 15 illustrates a user interface depicting moving of a delineated image region from one video to another, in accordance with an embodiment.
Figure 16:
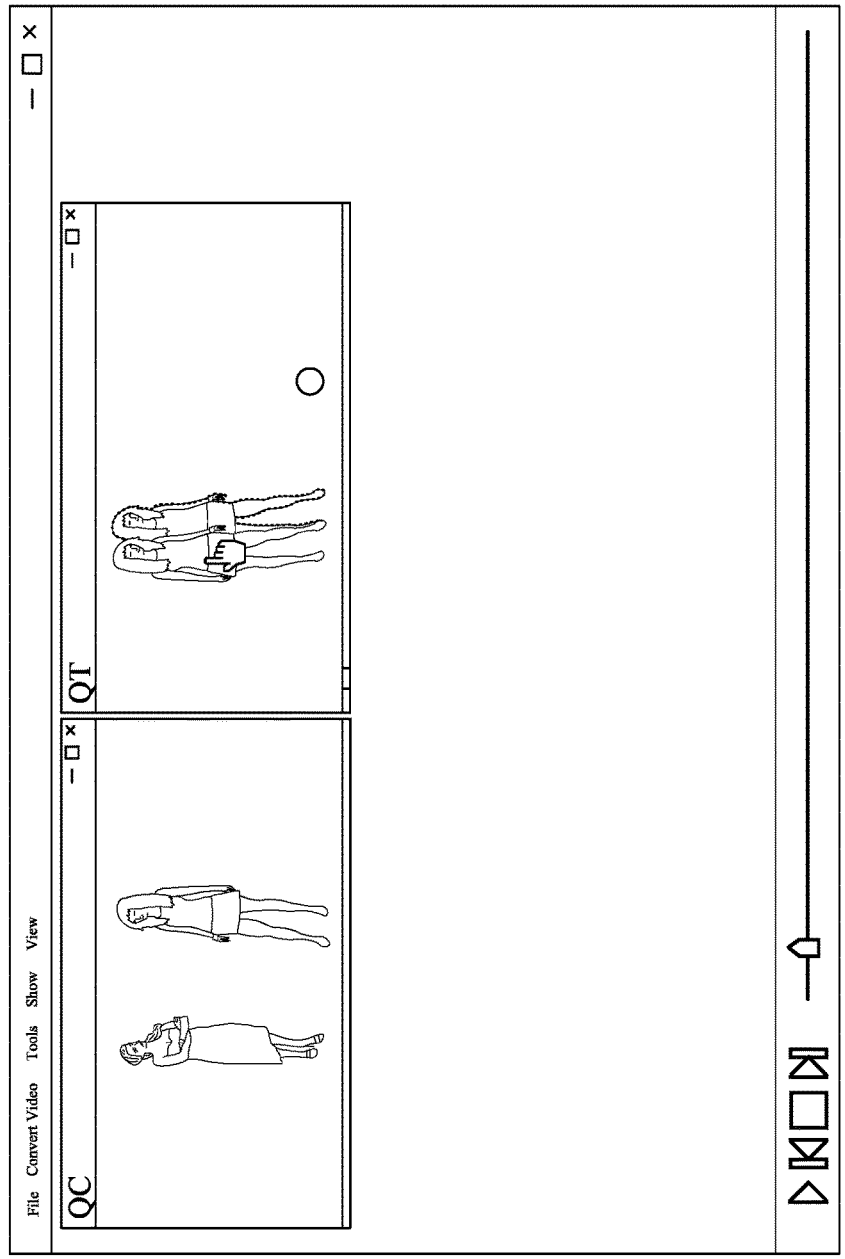
FIG. 16 illustrates a user interface depicting generation of a mask of a delineated image region moved from one video to another, in accordance with an embodiment.
Figure 17:
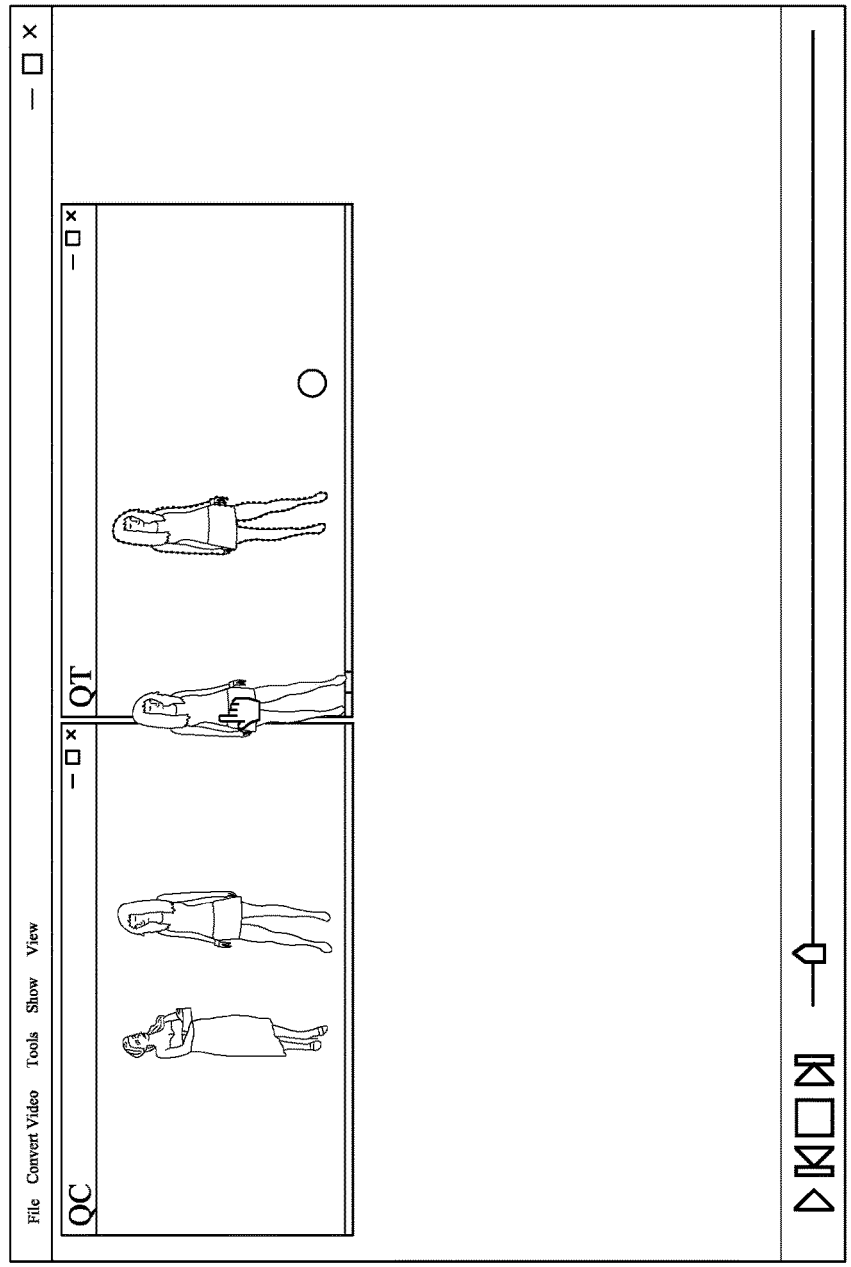
FIG. 17 illustrates a user interface depicting moving of a mask of a delineated image region, in accordance with an embodiment.
Figure 18:
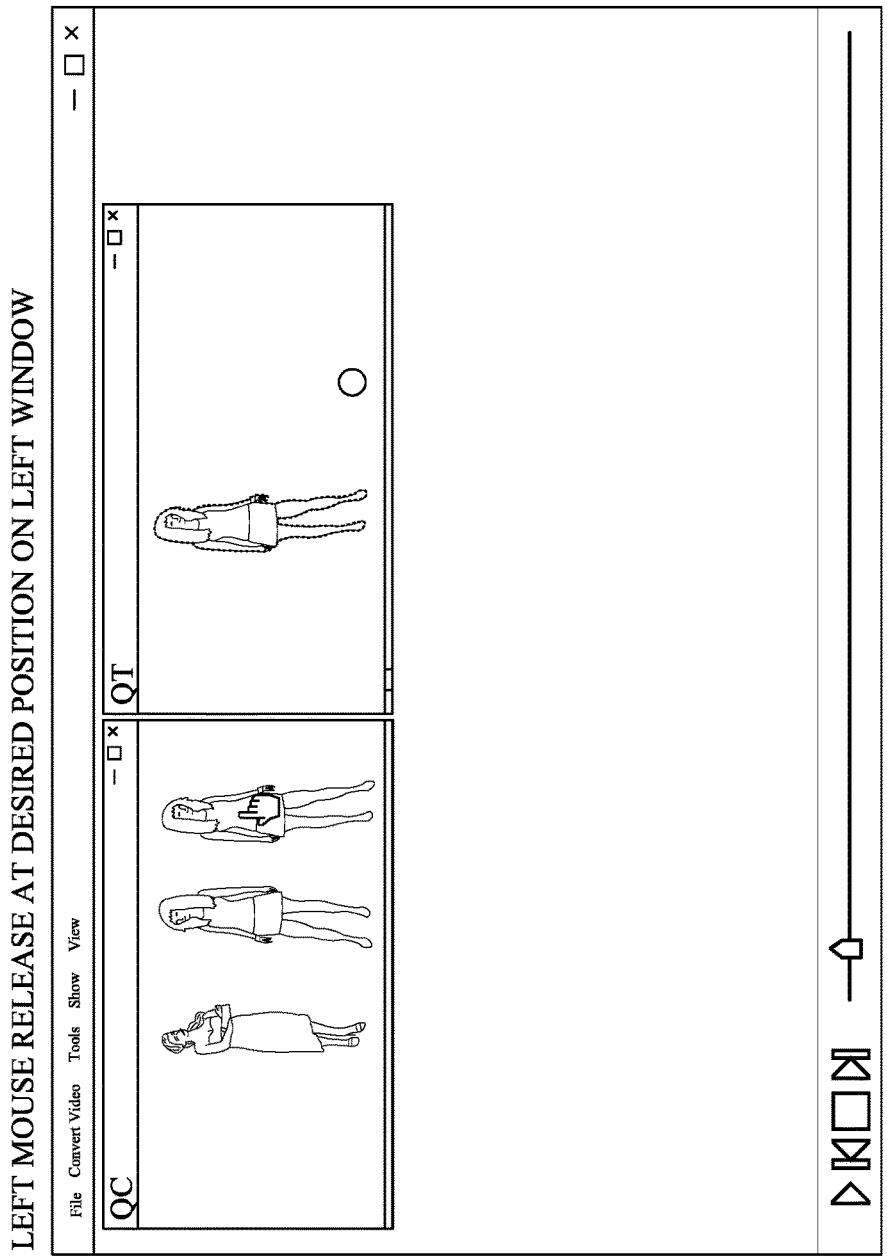
FIG. 18 illustrates a user interface depicting positioning of a mask of the delineated image region, in accordance with an embodiment.
Figure 18:
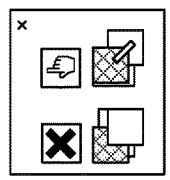

FIG. 13 and FIG. 14, illustrate a user interface of the Hypervideo platform to designate the image region as one of a Front object and Back object, in accordance with some embodiments. The object from the multiple images may be layered as front or back to the other multiple images. FIG. 15 describes the selection of the new object in the right window and lets it track for the successive frames. Further, FIG. 16 to FIG. 18 illustrates the drag operation which may be performed by the user on the selected object frames to move the object to the left window.

Figure 19:
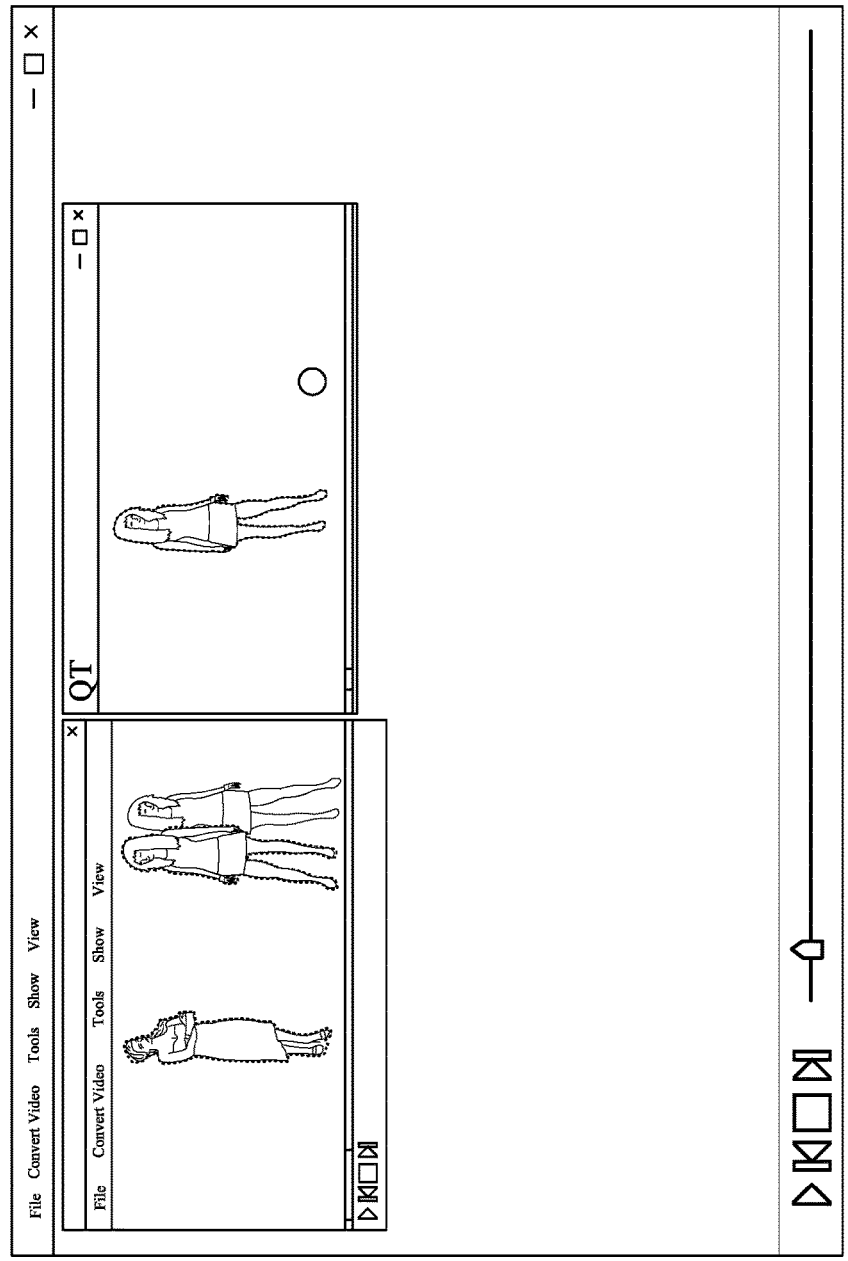
FIG. 19 illustrates a user interface depicting placement of the delineated image region, in accordance with an embodiment.
Figure 19:
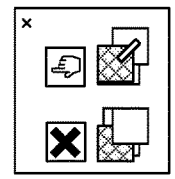
Figure 20:
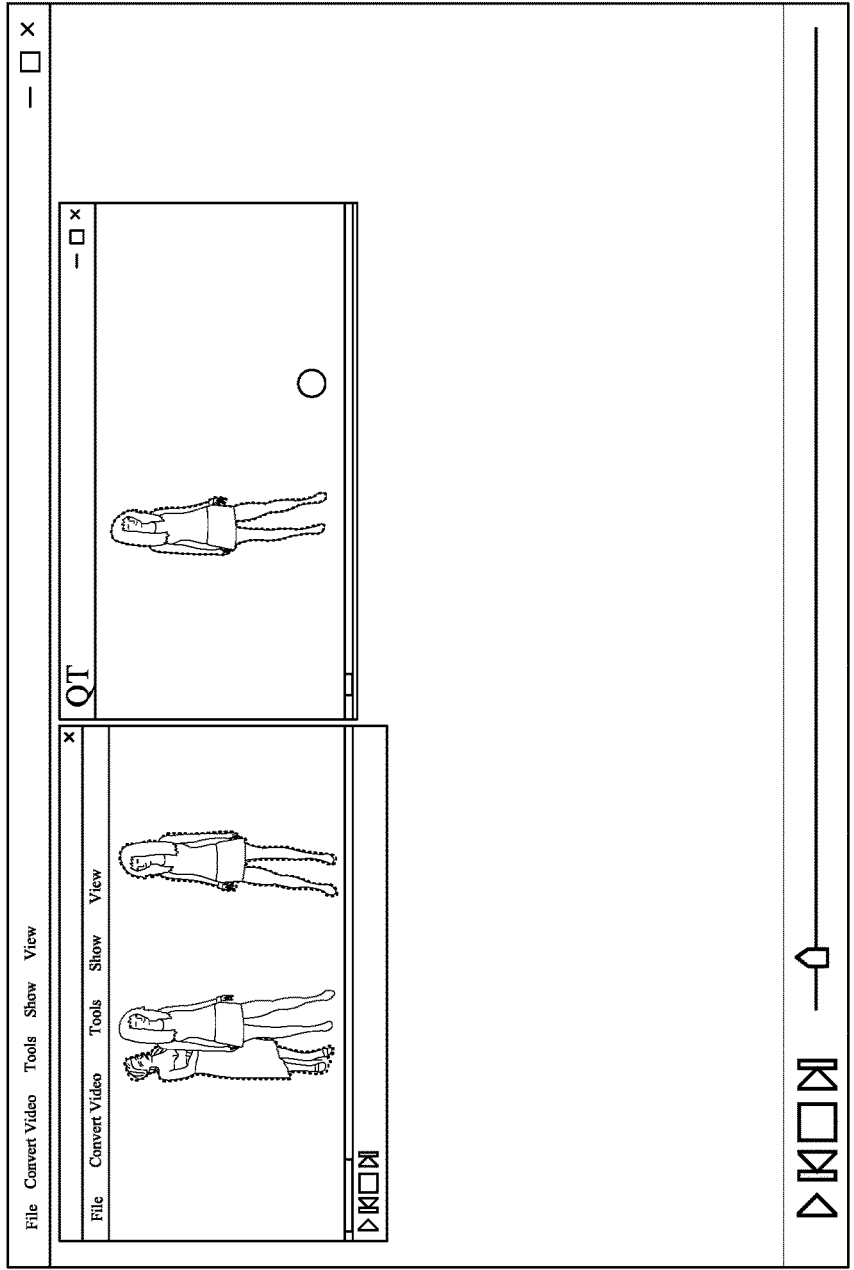
FIG. 20 illustrates a user interface depicting designation of a layer to the delineated image region, in accordance with an embodiment.

Further, the method may be configured to move the selected object from the one or more images to another video. FIG. 19 shows the action of dropping the selected object to the video played in the left window. Note that the new video object observes the layer hierarchy of where it should sit relative to predefined Front and Back position of existing video objects. In this case, the new video object sits behind the video object designated as Front in FIG. 13. The user then plays the video in the left window. Further in FIG. 20, where the new video object moves to the front relative to the video object designated as Back in FIG. 14.

Figure 6:
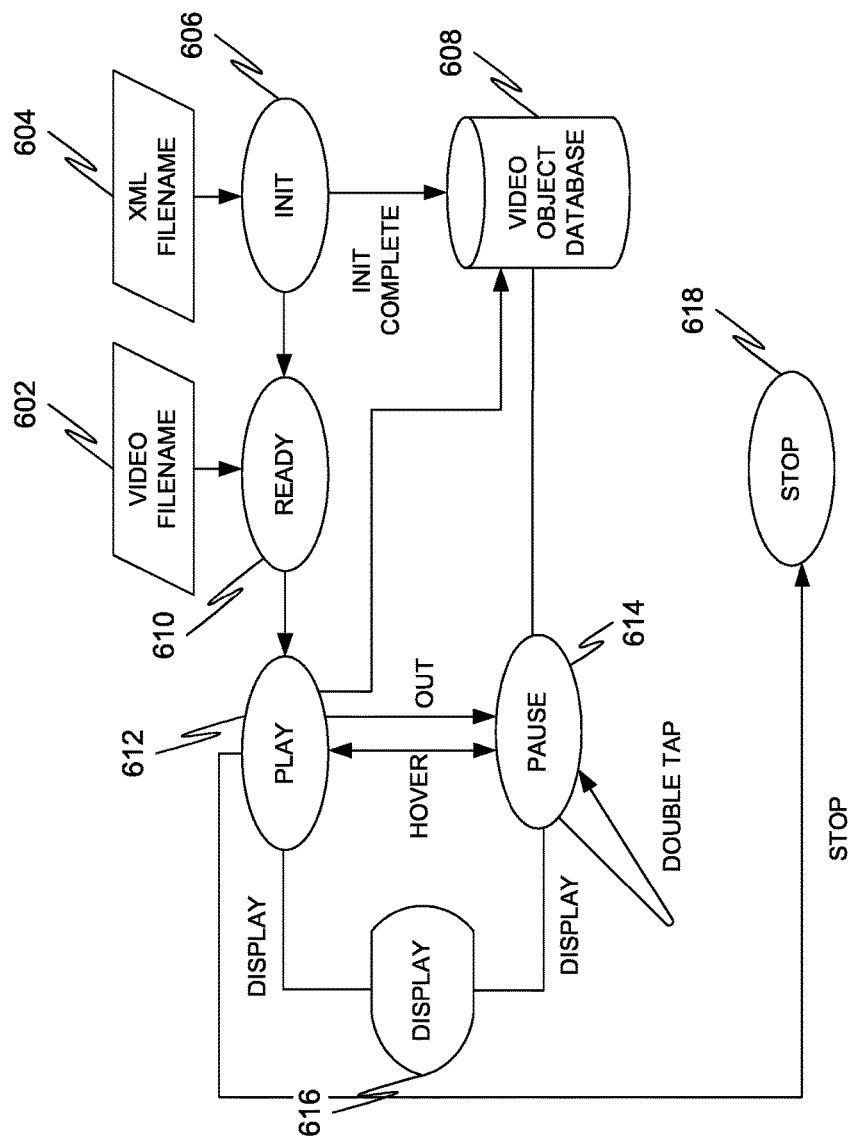
FIG. 6 illustrates a flowchart of a method of presenting metadata associated with a selected object in a video, in accordance with an embodiment.
Figure 10:
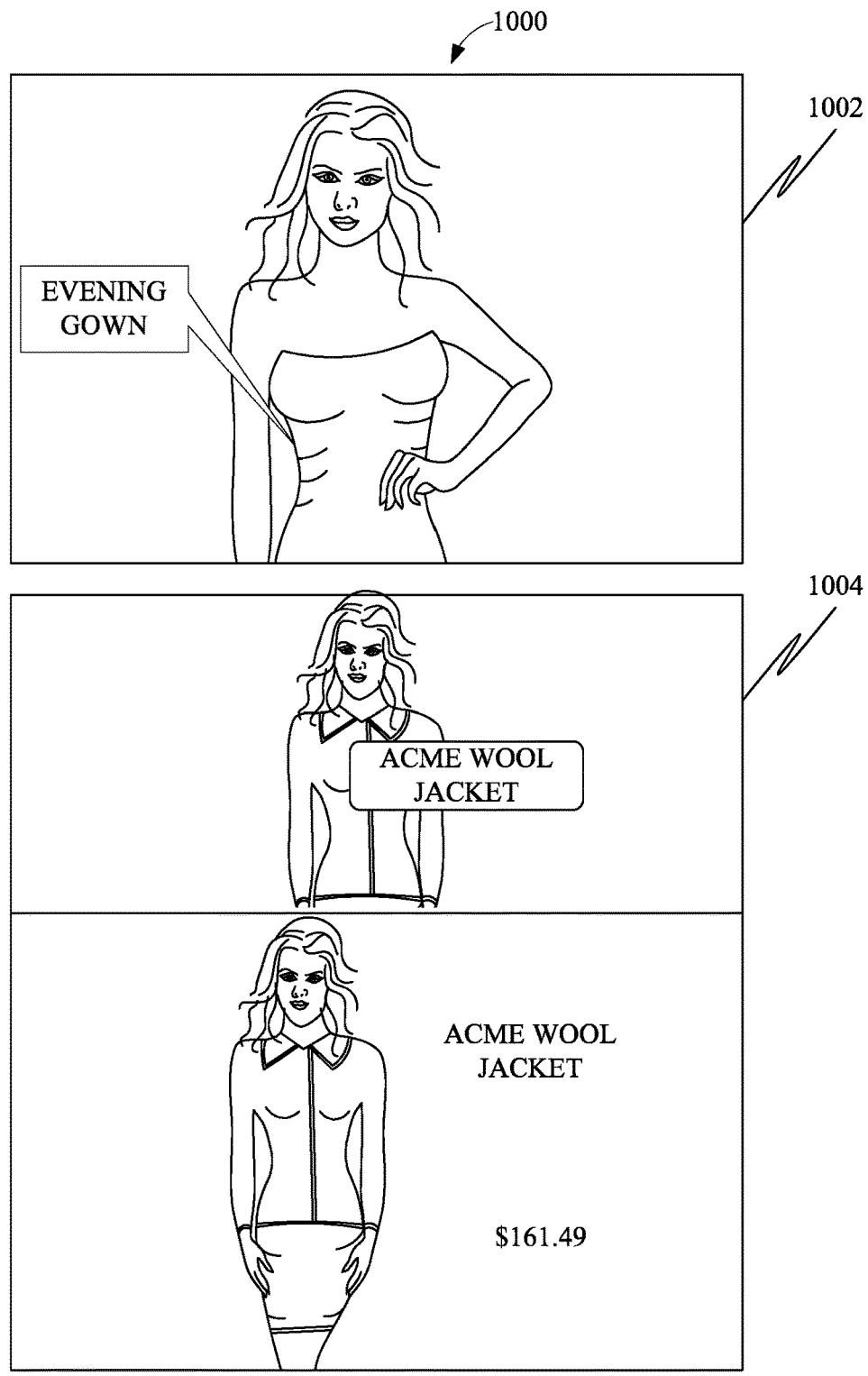
FIG. 10 illustrates a user interface depicting an image object displaying unique identifiers, in accordance with an embodiment.

FIG. 6 illustrates a flowchart 600 of a method to identify an object in multiple images, in accordance with an embodiment. In the flowchart 600, a video filename 602 and associated XML filename 604 containing metadata may be received at a computing device. The initialization module 606 may be an instance of the back end module 406 which is mentioned in FIG. 4. The initialization module 606 may be synced with the video object database 608 to update and store the information associated with the video filename 602 and XML filename 604. At 610, the object within the multiple images may be read by the back end module 402. Further, at 612, the user may play the multiple images which may be displayed on the display 616. At this instance, the user may perform a hovering action over the object in the multiple images using the pointing device or a finger. The finger may be recognized by the display 616 which may be the touchscreen or any other sensor-driven display. At 614, in response to the hovering action, the current frame is paused. The display 626 may render at least one attribute which may include each of the position and the boundary associated with the object. The multiple attribute includes one or more of the name, the description, the Universal Resource Locator (URL), the price and the thumbnail photo. For example, FIG. 10 illustrates a user interface of an image object displaying unique identifiers, in accordance with an embodiment. A video advertisement may be played in a browser, video player, or any other application. In the user interface 1002, a model 1004 in an evening gown is displayed. When the user uses the pointing device to perform the hovering action, then the description 1006 of the dress may be displayed.

Further, at 614, the user may perform a long tap or double-click operation which may launch the URL of the object in accordance with the area of selection. For example, in FIG. 10, the user interface 1008 displays the model 1010 wearing an Acme™ Wool Jacket. While watching the video, the user may long tap or double-click the model 1010 which may launch the URL of the object as shown in the user interface 1012. Further, in another instance, the user may provide an input to the display 616 which may move out the focus from the selected object. Eventually, the video may be resumed from the instance where it was last paused. At 618, the user stops the motion of the video.

Figure 11:
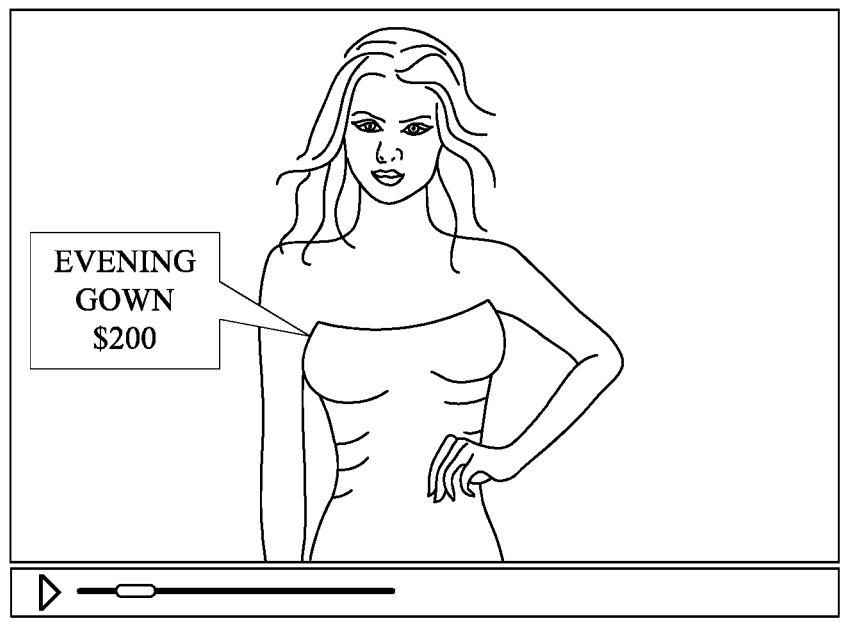
FIG. 11 illustrates a user interface depicting an image object displaying unique identifiers, in accordance with an embodiment.

In another example, FIG. 11 illustrates a starring actress in different scenes In the scene of FIG. 11, an actress may be wearing an evening Yves St Laurent™ dress. In another scene (FIG. 10), an actress is wearing an ACME wool jacket. As illustrated in FIG. 10, the unique brands are represented as unique objects including one or more attributes. The user may to go to the first scene which includes the evening dress by simply selecting the thumbnail photo which is shown at the bottom of the user interface.

Figure 12:
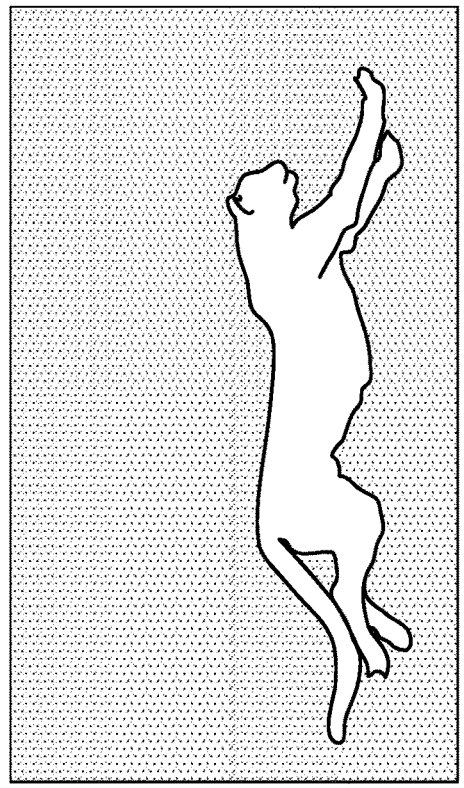
FIG. 12 illustrates a user interface showing the delineation of the object from one or more images, in accordance with an embodiment.
Figure 12:
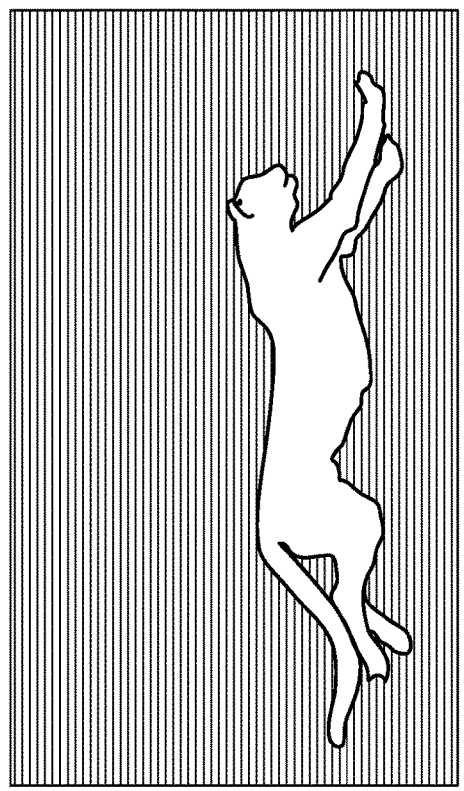

In another embodiment of the present invention, FIG. 12 illustrates the user interface showing the delineation of the object. The Hypervideo platform may be configured to create special effects for a video where selected objects can be moved from one video to another video. The Hypervideo platform may allow user to delineate a boundary surrounding a particular region of a video frame. That region delineates a visually meaningful object for that frame. For example, in FIG. 12, the method delineates the object (a cheetah) strolling in a lined background. The method automatically tracks the moving cheetah across the user designated set of contiguous frames. Further, the Hypervideo platform may allow user to copy that delineated region in each of the contiguous frames to a new location in another video. For example, FIG. 12 illustrates the same cheetah running in a dotted background while maintaining the same contiguity as the source. When the video is played, it displays the video of the moving cheetah in the dotted background.

Figure 21:
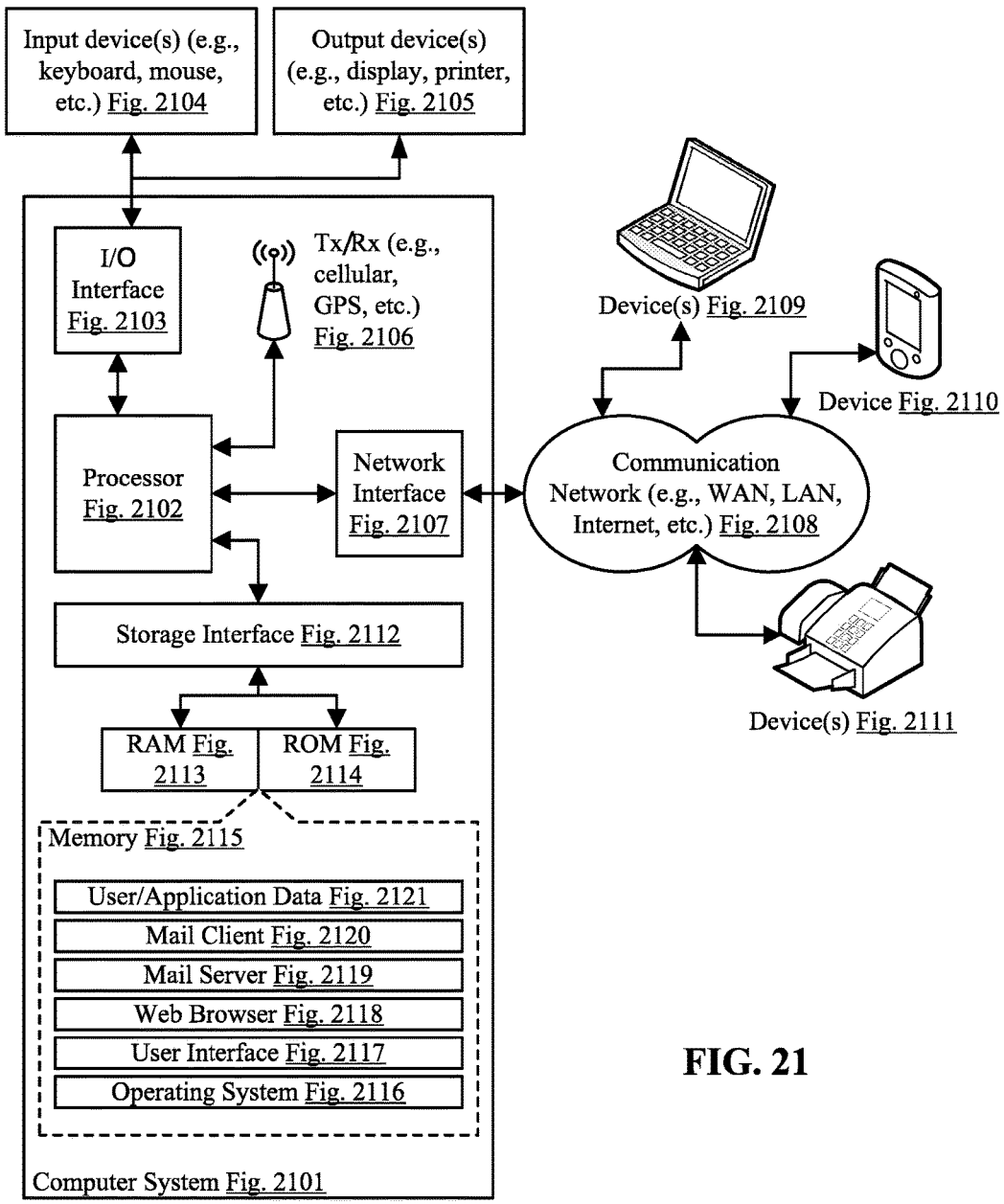
FIG. 21 illustrates an exemplary computing system that may be employed to implement processing functionality for various embodiments.

Referring now to FIG. 21, a block diagram of an exemplary computer system 2101 for implementing embodiments consistent with the present disclosure is illustrated. Variations of computer system 2101 may be used for implementing system 102 (the cloud server 102). Computer system 2101 may comprise a central processing unit ("CPU" or "processor") 2102. Processor 2102 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 2102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 2102 may be disposed in communication with one or more input/output (I/O) devices via I/O interface 2103. The I/O interface 2103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 2103, the computer system 2101 may communicate with one or more I/O devices. For example, the input device 2104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 2105 may be a printer, fax machine, video display (e.g., cathode ray tube (CRT), liquid crystal display (LCD), light-emitting diode (LED), plasma, or the like), audio speaker, etc. In some embodiments, a transceiver 2106 may be disposed in connection with the processor 2102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 2102 may be disposed in communication with a communication network 2108 via a network interface 2107. The network interface 2107 may communicate with the communication network 2108. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 2108 may include, without limitation, a direct interconnection, local area network (LAN), wide area network (WAN), wireless network (e.g., using Wireless Application Protocol), the Internet, etc. Using the network interface 2107 and the communication network 2108, the computer system 2101 may communicate with devices 2109, 2110, and 2111. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 2102 may be disposed in communication with one or more memory devices (e.g., RAM 2113, ROM 2114, etc.) via a storage interface 2112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices 2115 may store a collection of program or database components, including, without limitation, an operating system 616, user interface application 2117, web browser 2118, mail server 2119, mail client 2120, user/application data 2121 (e.g., any data variables or data records discussed in this disclosure), etc. The operating system 2116 may facilitate resource management and operation of the computer system 2101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 2117 may facilitate display, execution, interaction, manipulation, or operation of program components through textual or graphical facilities. For example, user interfaces may provide computer interaction interface elements on a display system operatively connected to the computer system 2101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 2101 may implement a web browser 2118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 2101 may implement a mail server 2119 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 2101 may implement a mail client 2120 stored program component. The mail client may be a mail viewing application, such as Apple Mail, Microsoft Entourage, Microsoft Outlook, Mozilla Thunderbird, etc.

In some embodiments, computer system 2101 may store user/application data 2121, such as the data, variables, records, etc. (e.g., keywords, requirements, test cases, test scripts, sub requirements, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using Object-Store, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

We claim:

1. A computer implemented method for identifying and tracking an object in a plurality of images, the method comprising:
receiving, through an input device, a delineation of the object in at least one image of the plurality of images;
identifying, using the processor, an image region corresponding to the object in the at least one image based on the delineation, wherein the image region more accurately delineates the boundaries of the object within the image than the delineation input received by the input device, the image region determined at least in part by identifying pixels having the same color as and neighboring the pixels comprising the received object delineation; and
tracking, using the processor, the image region across the plurality of images within the video, wherein tracking includes:
generating, using the processor, a contour comprising a plurality of contour points based on the image region;
constructing, using the processor, a plurality of local windows for the object in the at least one image, the plurality of windows corresponding to a plurality of contour points;
estimating, using the processor, parameters corresponding to the plurality of local windows;
moving, using the processor, the plurality of local windows across the plurality of images based on optical flow; and
generating, using the processor, a mask of the object in at least one other image of the plurality of images based on parameters corresponding to the plurality of local windows subsequent to the moving plurality of local windows.

2. The method of claim 1 further comprising associating a unique identifier with the image region corresponding to the object.

3. The method of claim 1 further comprising:
comparing the image region with a plurality of delineated objects stored in a database; and
associating a unique identifier with the image region based on a result of the comparing.

4. The method of claim 1, wherein identifying the image region based on the delineation comprises:
generating, using the processor, an initial mask based on the delineation;
performing, using the processor, a graph cut on the initial mask to obtain a mask graph; and
determining, using the processor, a single connected region constituting the image region based on the mask graph.

5. The method of claim 1 further comprising integrating the plurality of local windows to generate a probability image corresponding to each of the at least one other image of the plurality of images, wherein a value associated with a pixel of the probability image represents a probability of the pixel belonging to the object.

6. The method of claim 5, wherein generating the mask of the object in at least one other image of the plurality of images is based further on the probability image corresponding to the at least one other image.

7. The method of claim 6, wherein the mask is generated based on a matting algorithm.

8. The method of claim 1 further comprising storing, in a storage device, at least one attribute corresponding to the object.

9. The method of claim 8, wherein the at least one attribute comprises each of a position and a boundary associated with the object.

10. The method of claim 8, wherein the at least one attribute comprises at least one of a name, a description, a Universal Resource Locator (URL), a price and a thumbnail photo.

11. The method of claim 8, wherein the at least one attribute is stored in an extended Markup Language (XML) file.

12. The method of claim 1 further comprising receiving, through the input device, an indication of a background corresponding to the object in the at least one image.

13. A system for identifying and tracking an object in a plurality of images, the system comprising:
an input device configured for receiving a delineation of the object in at least one image of the plurality of images;
a processor;
memory; and
instructions stored in memory and executable by the processor to perform operations of:
identifying an image region corresponding to the object in the at least one image based on the delineation, wherein the image region more accurately delineates the boundaries of the object within the image than the delineation input received by the input device, the image region determined at least in part by identifying pixels having the same color as and neighboring the pixels comprising the received object delineation; and tracking the image region across the plurality of images tracking the image region across the plurality of images, wherein tracking includes:

generating, using the processor, a contour comprising a plurality of contour points based on the image region;

constructing, using the processor, a plurality of local windows for the object in the at least one image, the plurality of windows corresponding to a plurality of contour points;

estimating, using the processor, parameters corresponding to the plurality of local windows;

moving, using the processor, the plurality of local windows across the plurality of images based on optical flow; and generating, using the processor, a mask of the object in at least one other image of the plurality of images based on parameters corresponding to the plurality of local windows subsequent to the moving plurality of local windows.

14. The system of claim 13 further comprising a database, wherein the processor is further configured for:

comparing the image region with a plurality of delineated objects stored in the database; and associating a unique identifier with the image region based on a result of the comparing.

15. The system of claim 13, wherein identifying the image region based on the delineation comprises:

generating an initial mask based on the delineation;

performing a graph cut on the initial mask to obtain a mask graph; and determining a single connected region constituting the image region based on the mask graph.

16. The system of claim 13, wherein the processor is further configured for integrating the plurality of local windows to generate a probability image corresponding to each of the at least one other image of the plurality of images, wherein a value associated with a pixel of the probability image represents a probability of the pixel belonging to the object.

17. The system of claim 16, wherein generating the mask of the object in at least one other image of the plurality of images is based further on the probability image corresponding to the at least one other image.

18. The system of claim 16, wherein the mask is generated based on a matting algorithm.

* * * * *